(12) United States Patent
Kamei et al.

(10) Patent No.: US 9,465,802 B2
(45) Date of Patent: Oct. 11, 2016

(54) CONTENT STORAGE PROCESSING SYSTEM, CONTENT STORAGE PROCESSING METHOD, AND SEMICONDUCTOR INTEGRATED CIRCUIT

(75) Inventors: Rinako Kamei, Osaka (JP); Hiromi Iida, Osaka (JP); Junichiro Soeda, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 783 days.

(21) Appl. No.: 13/059,785

(22) PCT Filed: Dec. 22, 2009

(86) PCT No.: PCT/JP2009/007132
§ 371 (c)(1),
(2), (4) Date: Feb. 18, 2011

(87) PCT Pub. No.: WO2010/073629
PCT Pub. Date: Jul. 1, 2010

(65) Prior Publication Data
US 2011/0145305 A1    Jun. 16, 2011

(30) Foreign Application Priority Data
Dec. 22, 2008    (JP) ................. 2008-325212

(51) Int. Cl.
G06F 17/30      (2006.01)
G11B 27/34      (2006.01)
(Continued)

(52) U.S. Cl.
CPC ... *G06F 17/30038* (2013.01); *G06F 17/30265* (2013.01); *G11B 27/34* (2013.01);
(Continued)

(58) Field of Classification Search
CPC .................................. G06F 17/30244
USPC .......................... 707/754, E17.095
See application file for complete search history.

(56) References Cited

U.S. PATENT DOCUMENTS

2003/0221164 A1*   11/2003   Williams et al. ......... 715/501.1
2003/0236752 A1    12/2003   Dawson et al.
(Continued)

FOREIGN PATENT DOCUMENTS

JP    2001-333411    11/2001
JP    2003-274320    9/2003
(Continued)

OTHER PUBLICATIONS

Sarvas, Risto, et al. "Metadata creation system for mobile images. "Proceedings of the 2nd international conference on Mobile systems, applications, and services. ACM, 2004.*
(Continued)

Primary Examiner — Nan Hutton
(74) Attorney, Agent, or Firm — Wenderoth, Lind & Ponack, L.L.P.

(57) ABSTRACT

A content storage device is in a content storage processing system, which includes a plurality of content storage devices connect to one another via a network. The content storage device transmits metadata corresponding to a specified original content and collects metadata that is relevant to the metadata corresponding to the original content from other content storage devices. The content storage device adds information included in the collected metadata to the metadata corresponding to the original content to enrich information included in the metadata corresponding to the original content.

8 Claims, 20 Drawing Sheets

(51) Int. Cl.
*H04N 1/32* (2006.01)
*H04N 9/82* (2006.01)
*H04N 21/4147* (2011.01)
*H04N 21/4223* (2011.01)
*H04N 21/433* (2011.01)
*H04N 21/84* (2011.01)
*H04N 5/77* (2006.01)
*H04N 5/781* (2006.01)
*H04N 5/85* (2006.01)

(52) U.S. Cl.
CPC ...... *H04N1/32122* (2013.01); *H04N 1/32144* (2013.01); *H04N 9/8205* (2013.01); *H04N 21/4147* (2013.01); *H04N 21/4223* (2013.01); *H04N 21/4334* (2013.01); *H04N 21/84* (2013.01); *H04N 5/77* (2013.01); *H04N 5/781* (2013.01); *H04N 5/85* (2013.01); *H04N 2201/3204* (2013.01); *H04N 2201/3214* (2013.01); *H04N 2201/3253* (2013.01); *H04N 2201/3273* (2013.01); *H04N 2201/3274* (2013.01)

(56) References Cited

U.S. PATENT DOCUMENTS

| | | |
|---|---|---|
| 2007/0167044 A1 | 7/2007 | Ogren |
| 2007/0226315 A1* | 9/2007 | Espelien ................. 709/217 |
| 2008/0306995 A1* | 12/2008 | Newell et al. ............ 707/104.1 |
| 2009/0119333 A1* | 5/2009 | Sundstrom et al. ....... 707/104.1 |
| 2009/0138490 A1 | 5/2009 | Hollemans et al. |

FOREIGN PATENT DOCUMENTS

| | | |
|---|---|---|
| JP | 2004-127249 | 4/2004 |
| JP | 2004-234128 | 8/2004 |
| JP | 2007-122533 | 5/2007 |
| WO | 2005/076577 | 8/2005 |
| WO | 2006/051460 | 5/2006 |

OTHER PUBLICATIONS

Viana, Windson, et al. "A semantic approach and a web tool for contextual annotation of photos using camera phones." Web Information Systems Engineering—WISE 2007. Springer Berlin Heidelberg, 2007. 225-236.*

International Search Report issued Feb. 2, 2010 in International (PCT) Application No. PCT/JP2009/007132.

* cited by examiner

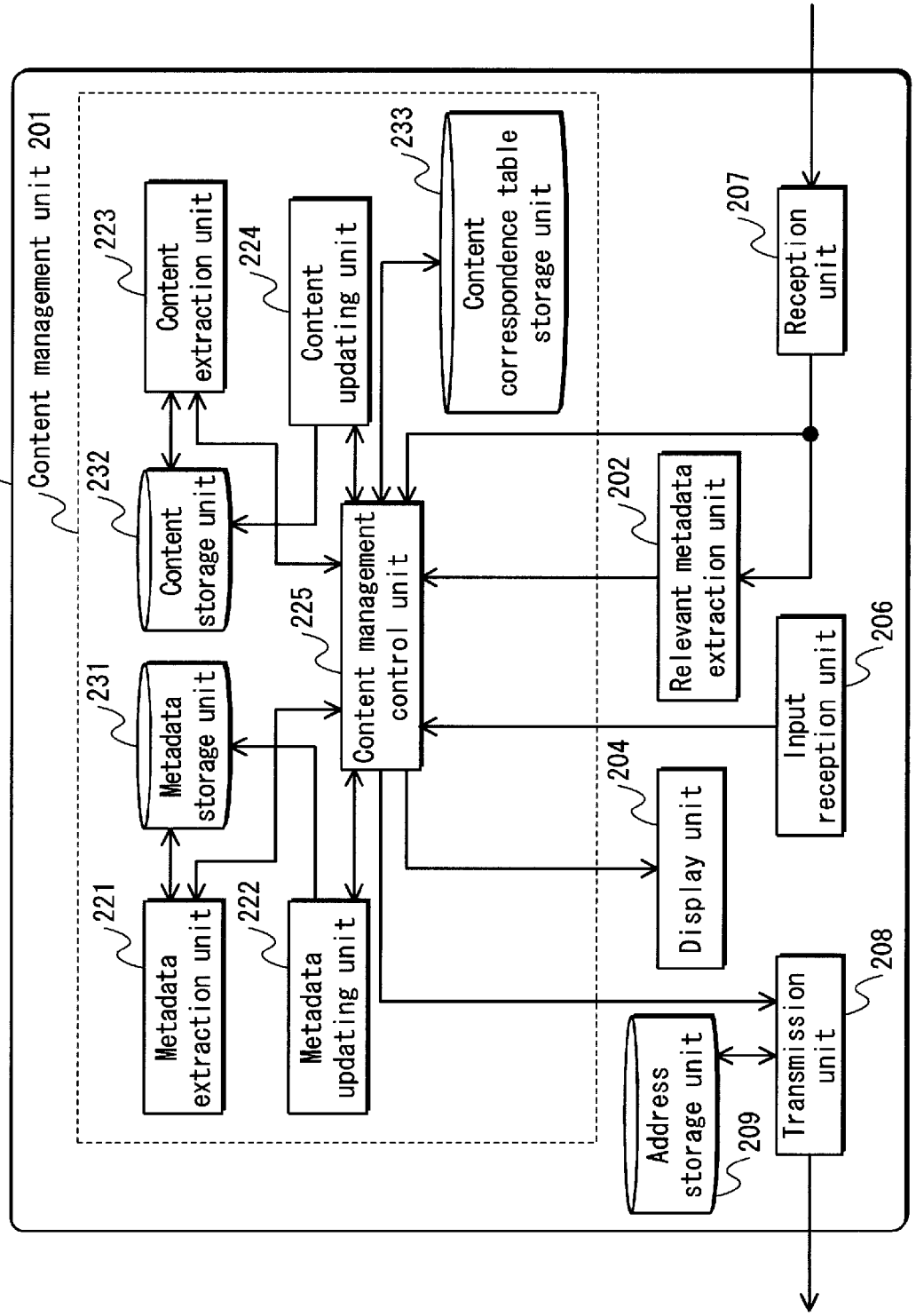

FIG. 3

| Content ID 301 | Attribute information 302 | | Match flag 305 | Original content ID 306 | |
|---|---|---|---|---|---|
| | Attribute ID | Attribute value 310 304 | | | |
| A0001 | Attribute 1 (capture date) | August 16, 2003 | 0 | A0001 | ⎫ Original sub-metadata 311 |
| | Attribute 2 (capture location) | London | 0 | | |
| | Attribute 3 (person) | User A (Coordinates), User B (Coordinates) | 0 | | |
| | Attribute 1 (capture date) | August 16, 2003 | 1 | C0005 | ⎫ Additional sub-metadata A312 |
| | Attribute 2 (capture location) | Osaka | 0 | | |
| | Attribute 3 (person) | User X (Coordinates) | 0 | | |
| | Attribute 1 (capture date) | February 6, 2005 | 0 | C0014 | ⎫ Additional sub-metadata B313 |
| | Attribute 2 (capture location) | London | 1 | | |
| | Attribute 3 (person) | User Y (Coordinates) | 0 | | |
| | Attribute 1 (capture date) | September 26, 2000 | 0 | B0012 | ⎫ Additional sub-metadata C314 |
| | Attribute 2 (capture location) | Beijing | 0 | | |
| | Attribute 3 (person) | User Z (Coordinates), User B (Coordinates) | 1 | | |
| | Attribute 1 (capture date) | January 22, 2005 | 0 | B0020 | ⎫ Additional sub-metadata D315 |
| | Attribute 2 (capture location) | Fukuoka | 0 | | |
| | Attribute 3 (person) | User B (Coordinates) | 1 | | |

Metadata 300

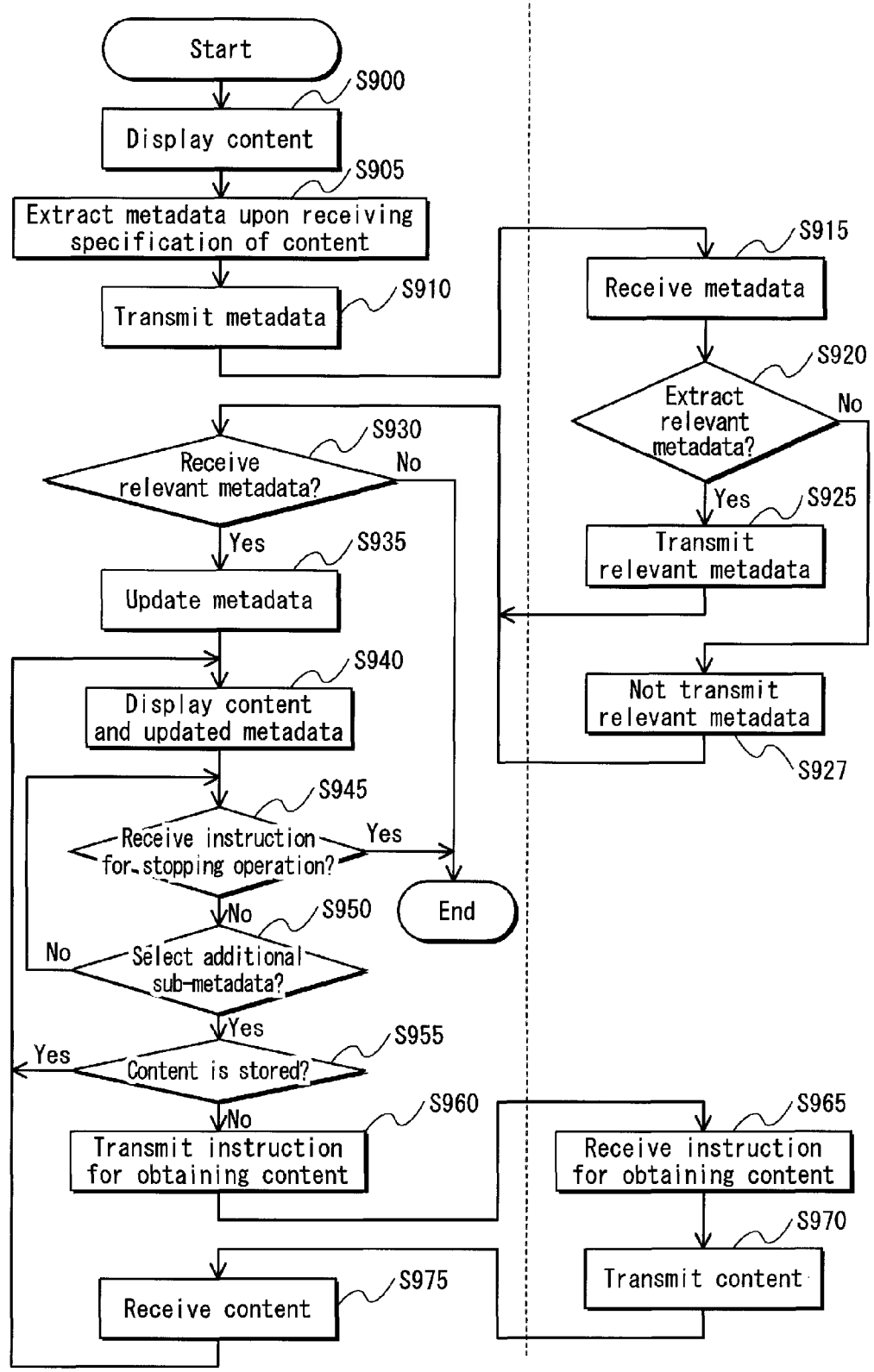

FIG. 12A

| Content ID | Attribute information | | Match flag | Original content ID | |
|---|---|---|---|---|---|
| | Attribute ID | Attribute value | | | |
| A0001 | Attribute 1 (capture date) | August 16, 2003 | 0 | A0001 | Meta-data 1001 |
| | Attribute 2 (capture location) | London | 0 | | |
| | Attribute 3 (person) | User A (Coordinates), User B (Coordinates) | 0 | | |

FIG. 12B

| Content ID | Attribute information | | Match flag | Original content ID | |
|---|---|---|---|---|---|
| | Attribute ID | Attribute value | | | |
| C0005 | Attribute 1 (capture date) | August 16, 2003 | 0 | C0005 | Meta-data 1002 |
| | Attribute 2 (capture location) | Osaka | 0 | | |
| | Attribute 3 (person) | User X (Coordinates) | 0 | | |

FIG. 12C

| Content ID | Attribute information | | Match flag | Original content ID | |
|---|---|---|---|---|---|
| | Attribute ID | Attribute value | | | |
| C0014 | Attribute 1 (capture date) | February 6, 2005 | 0 | C0014 | Meta-data 1003 |
| | Attribute 2 (capture location) | London | 0 | | |
| | Attribute 3 (person) | User Y (Coordinates) | 0 | | |

FIG. 12D

| Content ID | Attribute information | | Match flag | Original content ID | |
|---|---|---|---|---|---|
| | Attribute ID | Attribute value | | | |
| B0012 | Attribute 1 (capture date) | September 26, 2000 | 0 | B0012 | Meta-data 1004 |
| | Attribute 2 (capture location) | Beijing | 0 | | |
| | Attribute 3 (person) | User Z (Coordinates), User B (Coordinates) | 0 | | |

FIG. 12E

| Content ID | Attribute information | | Match flag | Original content ID | |
|---|---|---|---|---|---|
| | Attribute ID | Attribute value | | | |
| B0020 | Attribute 1 (capture date) | January 22, 2005 | 0 | B0020 | Meta-data 1005 |
| | Attribute 2 (capture location) | Fukuoka | 0 | | |
| | Attribute 3 (person) | User B (Coordinates) | 0 | | |

FIG. 17

| Content ID | Attribute information | | Match flag | Search target flag | Original content ID |
|---|---|---|---|---|---|
| | Attribute ID | Attribute value | | | |
| B0001 | Attribute 1 (capture date) | December 31, 1999 | 0 | 0 | B0001 |
| | Attribute 2 (capture location) | London | 0 | 0 | |
| | Attribute 3 (person) | User X (Coordinates) | 0 | 0 | |

FIG. 18

| Priority level (1601) | Attribute ID (1602) |
|---|---|
| 1 | Attribute 1 (capture date) |
| 2 | Attribute 2 (capture location) |
| 3 | Attribute 3 (person) |

FIG. 19

| User ID (1701) | Search condition (1702) |
|---|---|
| User A | No restriction |
| User B | Attribute 2 (capture location) is not search target |
| User C | Attribute 1 (capture date) is not search target |
| ... | ... |

CONTENT STORAGE PROCESSING SYSTEM, CONTENT STORAGE PROCESSING METHOD, AND SEMICONDUCTOR INTEGRATED CIRCUIT

BACKGROUND OF THE INVENTION

1. Technical Field

The present invention relates to a content storage processing system for storing contents.

2. Background Art

The use of a device for capturing digital contents such as a digital still camera, and a digital video camera, and a device for storing digital contents such as a hard disk recorder and a personal computer with a high-capacity hard disk, has become popular. This has made it easy for users to create and manage digital contents such as digital photographs.

Metadata that includes information relating to a situation in which a digital content was captured, for example, information about a date when the digital content was captured, a location at which the digital content was captured, a person who is an object of capturing and so on is recorded in association with the digital content.

For example, as a format for storing metadata corresponding to digital photographs, a file format called Exif (EXchangeable Image file Format) is used. A digital still camera compatible with Exif records information relating to a situation in which photographs were captured as metadata in Exif in association with the photographs.

By referring to the metadata when viewing contents, users can remember a situation in which the contents were captured.

Technology for introducing contents to a friend and so on by utilizing an internet environment is disclosed in Patent Literatures 1 and 2. According to the technology, contents are used as a tool for having communication with a friend and so on.

CITATION LIST

Patent Literature

[Patent Literature 1]
Japanese Patent Application Publication No. 2001-333411
[Patent Literature 2]
Japanese Patent Application Publication No. 2004-234128

SUMMARY OF INVENTION

Metadata in conventional technology, however, includes only information relating to a situation in which contents were captured. Therefore, there is a limit to referable information about the contents.

The present invention has been achieved in view of the above problem, and aims to provide a content storage processing system that provides a wide range of referable information about contents, by collecting information relevant to the contents.

In order to achieve the above aim, one aspect of the present invention is a content storage processing system comprising: a content storage unit operable to store therein a plurality of contents; a metadata storage unit operable to store therein a plurality of pieces of metadata being in one-to-one correspondence with the plurality of contents, the plurality of pieces of metadata each including two or more pieces of attribute information showing attributes of a corresponding content; a content specification reception unit operable to receive specification of a content among the plurality of contents stored in the content storage unit; an original metadata extraction unit operable to extract a first piece of metadata corresponding to the specified content from the plurality of pieces of metadata stored in the metadata storage unit; a relevant metadata search unit operable to search the metadata storage unit for a second piece of metadata including one or more pieces of attribute information that are identical to corresponding one or more pieces of attribute information included in the first metadata, and extract the second metadata; and an attribute information addition unit operable, when the content specification reception unit receives the specification, the original metadata extraction unit extracts the first metadata, and the relevant metadata search unit extracts the second metadata, to perform either or both of the following: addition of one or more pieces of attribute information included in the second metadata to the first metadata; and addition of one or more pieces of attribute information included in the first metadata to the second metadata.

According to the content storage processing system in the present invention having the above structure, when the content specification reception unit receives the specification of a content, the original metadata extraction unit extracts the first metadata, and the relevant metadata search unit extracts the second data, either or both of the addition of attribute information included in the second metadata to the first metadata or/and the addition of attribute information included in the first metadata to the second metadata is/are performed.

Therefore, by receiving the specification of a content from a user, the content storage processing system in the present invention having the above structure enriches information included in metadata corresponding to the content. Alternatively, the content storage processing system enriches information included in metadata corresponding to a content relevant to the content, and therefore provides an advantageous effects that a wide range of information relevant to the content is provided.

The content storage processing system may further comprise a display unit operable, (i) when the content specification reception unit receives the specification of the content, to display the content to be specified, and, (ii) when the attribute information addition unit performs either or both of the addition, to display metadata having been added the one or more pieces of attribute information and a content corresponding to the metadata together.

With this structure, it becomes possible, when the content specification reception unit receives the specification of the content, to visually identify the content to be specified. Furthermore, when attribute information is added to the metadata, it becomes possible to visually identify the metadata having been added the attribute information.

Yet another aspect of the present invention is the content storage processing system, wherein the content storage unit includes a first content storage sub-unit in a first content storage processing device and a second content storage sub-unit in a second content storage processing device, the metadata storage unit includes a first metadata storage sub-unit in the first content storage processing device and a second metadata storage sub-unit in the second content storage processing device, the first metadata storage sub-unit being operable to store therein a plurality of pieces of metadata being in one-to-one correspondence with a plurality of contents stored in the first content storage sub-unit, the second metadata storage sub-unit being operable to store therein a plurality of pieces of metadata being in one-to-one correspondence with a plurality of contents stored in the second content storage sub-unit, the content specification reception unit is included in the first content storage device, and receives specification of a content in the plurality of contents stored in the first content storage sub-unit, and the original metadata extraction unit is included in the first content storage device, and extracts the first metadata from the plurality of pieces of metadata stored in the first metadata storage sub-unit, the first content storage processing device further includes a first communication unit operable to transmit the first metadata, the second content storage processing device further includes a second communication unit operable to receive the first metadata transmitted by the first communication unit, the relevant metadata search unit is included in the second content storage processing device, and searches the second metadata storage sub-unit for the second metadata including one or more pieces of attribute information that are identical to corresponding one or more pieces of attribute information included in the first metadata received by the second communication unit, and extracts the second metadata, the attribute information addition unit includes a first attribute information addition sub-unit in the first content storage processing device and a second attribute information addition sub-unit in the second content storage processing device, the first attribute information addition sub-unit performing the addition of the one or more pieces of attribute information included in the second metadata to the first metadata, the second attribute information addition sub-unit performing the addition of the one or more pieces of attribute information included in the first metadata to the second metadata, the addition performed by the second attribute information addition sub-unit is addition, to the second metadata, of the one or more pieces of attribute information included in the first metadata that is received by the second communication unit, when the second metadata is extracted by the relevant metadata search unit, the second communication unit transmits the second metadata to the first communication unit, the first communication unit receives the second metadata transmitted by the second communication unit, and the addition performed by the first attribute information addition sub-unit is addition, to the first metadata, of the one or more pieces of attribute information included in the second metadata that is received by the first communication unit.

With this structure, the first content storage processing device and the second content storage processing device are physically separated from each other.

This provides an advantageous effect that the first content storage processing device including the first content storage sub-unit and the first metadata storage sub-unit, and the second content storage processing device including the second content storage sub-unit and the second metadata storage sub-unit are put in places geographically separated from each other.

Yet another aspect of the present invention is the content storage processing system, wherein the display unit includes a first display sub-unit in the first content storage processing device and a second display sub-unit in the second content storage processing device, the first display unit (i) displaying one or more contents targeted for the specification when the content specification reception unit receives the specification, and (ii) displaying the first metadata having been added the one or more pieces of attribute information included in the second metadata and the content corresponding to the first metadata together when the first attribute information addition unit performs the addition of the one or more pieces of attribute information included in the second metadata to the first metadata, the second display unit displaying the second metadata having been added the one or more pieces of attribute information included in the first metadata and the content corresponding to the second metadata together when the second attribute information addition unit performs the addition of the one or more pieces of attribute information included in the first metadata to the second metadata.

With this structure, when attribute information is added to the metadata stored in the first content storage processing device, it becomes possible to visually identify the metadata having been added the attribute information and the content corresponding to the metadata by using the first display sub-unit included in the first content storage processing device. Also, when attribute information is added to the metadata stored in the second content storage processing device, it becomes possible to visually identify the metadata having been added the attribute information and the content corresponding to the metadata by using the second display sub-unit included in the second content storage processing device.

Yet another aspect of the present invention is the content storage processing system, wherein each piece of attribute information belongs to any one of a plurality of attribute information types, and when the relevant metadata search unit extracts the second metadata including one or more pieces of attribute information that are identical to corresponding one or more pieces of attribute information included in the first metadata, the display unit determines a method for displaying the extracted second metadata based on a corresponding attribute information type to which the one or more pieces of attribute information included in the extracted second metadata belong, and displays the extracted second metadata according to the determined method.

With this structure, the present invention provides an advantageous effect that the content storage processing system capable of determining a method for displaying metadata based on a corresponding attribute information type is provided.

Yet another aspect of the present invention is the content storage processing system, wherein each piece of attribute information belongs to any one of a plurality of attribute information types having different priority levels, and the relevant metadata search unit searches for the second metadata including one or more pieces of attribute information that (i) are identical to corresponding one or more pieces of attribute information included in the first metadata, and (ii) belong to a corresponding attribute information type having the highest priority level.

With this structure, the present invention provides an advantageous effect that the relevant metadata search unit searches only for metadata including attribute information that belongs to a corresponding attribute information type having the highest priority level.

The other aspect of the present invention is the content storage processing system of claim 6, wherein each attribute information type has a search target flag showing whether or not the attribute information type is targeted for the searching, the content storage processing system further comprising: a predetermined operation reception unit operable to receive a predetermined operation; and a search target flag setting unit operable to determine whether or not each attribute information type is targeted for the searching after the predetermined operation reception unit receives the predetermined operation, and set the search target flag of the attribute information type, the relevant metadata search unit searches for the second metadata including one or more pieces of attribute information that (i) are identical to corresponding one or more pieces of attribute information included in the first metadata, and (ii) belong to corresponding attribute information types each having the search target flag that shows the attribute information type is targeted for the searching.

With this structure, the relevant metadata search unit does not search for metadata including attribute information that belongs to corresponding attribute information types each having the search target flag showing the attribute information type is targeted for the searching after the reception of the predetermined operation.

Therefore, after the reception of the predetermined operation, it becomes possible to eliminate the waste of searching for the attribute information belonging to corresponding attribute information types already having been searched for once again.

BRIEF DESCRIPTION OF DRAWINGS

FIG. 2 is a functional block diagram showing a functional block configuration of the content storage device 200.

FIG. 3 shows a data structure of metadata.

FIG. 11 is a flowchart showing an active metadata collection operation performed by a content storage processing system.

FIG. 12A shows a data structure of metadata 1001. FIGS. 12B to 12E respectively show data structures of metadata 1002 to 1005 relevant to the metadata 1001.

FIG. 17 shows a data structure of metadata.

FIG. 18 shows selection rule information stored in a selection rule information storage unit 1412.

FIG. 19 shows user information stored in a user information storage unit 1411.

DETAILED DESCRIPTION OF THE INVENTION

Embodiment 1

The following describes a content storage processing system in Embodiment 1 of the present invention having a structure in which a plurality of content storage devices connect one another via a network. Each of the plurality of content storage devices stores therein a content and metadata corresponding to the content.

A content storage device included in the content storage processing system communicates with another content storage device included in the same content storage processing system to collect metadata including information relevant to a content stored in the content storage device. The content storage device then adds the collected metadata to metadata stored in the content storage device to enrich information included in the metadata stored in the content storage device.

The following describes a configuration of the content storage processing system in Embodiment 1 with reference to the drawings.

<Configuration>
<Hardware Configuration of Content Storage Device 200>

Figure 1:
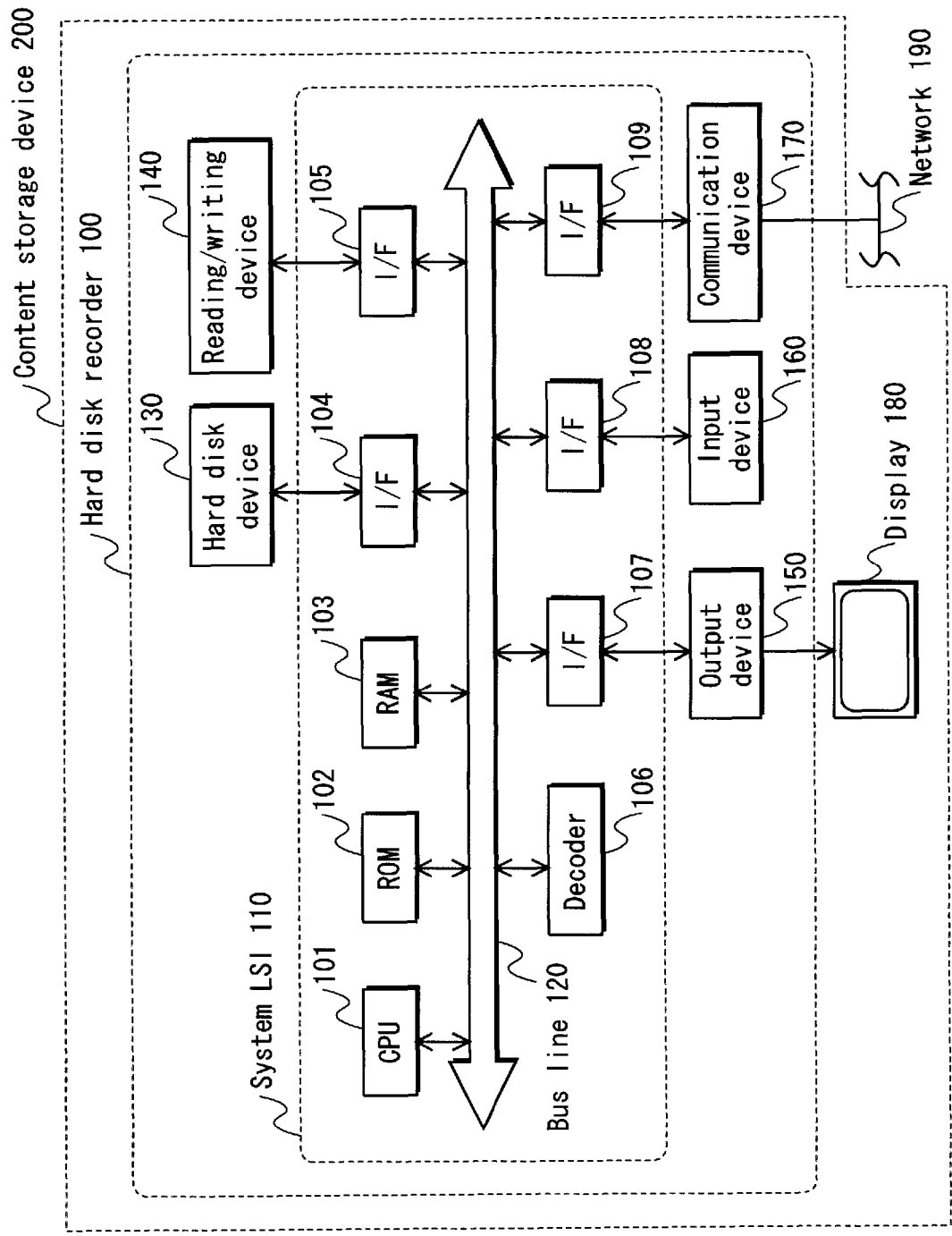
FIG. 1 is a hardware block diagram showing a hardware configuration of a content storage device 200.

FIG. 1 is a hardware block diagram showing a main hardware configuration of a content storage device 200.

As shown in FIG. 1, the content storage device 200 includes a hard disk recorder 100 connecting to a network 190, and a display 180.

The hard disk recorder 100 is an electronic device that stores a digital photograph (i.e. a content) as data encoded in JPEG (Joint Photographic Experts Group) format in association with metadata.

Here, the metadata is data including information relevant to the photograph (i.e. content). A data structure of the metadata is described in detail later.

The hard disk recorder 100 includes a system LSI (Large Scale Integrated circuit) 110, a hard disk device 130, a reading/writing device 140, an output device 150, an input device 160, and a communication device 170. The hard disk recorder 100 connects to the display 180 and the network 190.

The display 180 has a PDP (Plasma Display Panel), and connects to the hard disk recorder 100. The display 180 converts data output from the hard disk recorder 100 into an image, and then displays the converted image on the PDP.

The system LSI 110 integrates a CPU 101, a ROM 102, a RAM 103, a hard disk device interface 104, a reading/writing device interface 105, a decoder 106, an output device interface 107, an input device interface 108, a communication device interface 109, and a bus line 120 into a single integrated circuit. The system LSI 110 connects to the hard disk device 130, the reading/writing device 140, the output device 150, the input device 160, and the communication device 170.

The CPU 101 connects to the bus line 120. By executing a program stored in the ROM 102 or the RAM 103, the CPU 101 controls the ROM 102, the RAM 103, the decoder 106, the hard disk device 130, the reading/writing device 140, the output device 150, the input device 160, and the communication device 170 to achieve various functions. For example, the CPU 101 reads out encoded image data from the hard disk device 130, decodes the read out image data, and outputs the decoded image data to the display 180.

The ROM 102 connects to the bus line 120. The ROM 102 stores therein a program defining an operation performed by the CPU 101 and data used by the CPU 101.

The RAM 103 connects to the bus line 120. The RAM 103 temporarily stores data generated with the program execution by the CPU 101 as well as data read/written from/to the hard disk device 130 and the reading/writing device 140 and data received/transmitted by the communication device 170.

The decoder 106 is a DSP (Digital Signal Processor) that decodes encoded image data. The decoder 106 connects to the bus line 120, is controlled by the CPU 101, and decodes data encoded in JPEG format.

The hard disk device interface 104 connects to the hard disk device 130 and the bus line 120. The hard disk device interface 104 mediates transmission/reception of signals between the hard disk device 130 and the bus line 120.

The reading/writing device interface 105 connects to the reading/writing device 140 and the bus line 120. The reading/writing device interface 105 mediates transmission/reception of signals between the reading/writing device 140 and the bus line 120.

The output device interface 107 connects to the output device 150 and the bus line 120. The output device interface 107 mediates transmission/reception of signals between the output device 150 and the bus line 120.

The input device interface 108 connects to the input device 160 and the bus line 120. The input device interface 108 mediates transmission/reception of signals between the input device 160 and the bus line 120.

The communication device interface 109 connects to the communication device 170 and the bus line 120. The communication device interface 109 mediates transmission/reception of signals between the communication device 170 and the bus line 120.

The hard disk device 130 connects to the hard disk device interface 104. Controlled by the CPU 101, the hard disk device 130 reads/writes data from/to a hard disk built into the hard disk device 130.

The reading/writing device 140 connects to the reading/writing device interface 105. Controlled by the CPU 101, the reading/writing device 140 reads/writes data from/to an external recording medium.

Here, the external recording medium is, for example, a DVD (Digital Versatile Disc), DVD-R, DVD-RAM, BD (Blu-ray Disc), BD-R, BD-RE, and SD memory card. The reading/writing device 140 reads data from the DVD, BD, and the like, and reads/writes data from/to the DVD-R, BD-R, BD-RE, SD memory card, and the like.

The reading/writing device 140 reads a content and metadata from a device external to the content storage device 200 via an external recording medium such as an SD memory card. The content and metadata are, for example, image data and metadata corresponding to the image data both stored in a digital still camera.

The output device 150 connects to the output device interface 107 and the display 180. Controlled by the CPU 101, the output device 150 outputs data to be displayed on the display 180.

The input device 160 includes a remote control that receives commands, from a user, for operating the hard disk recorder 100, and a receiver that receives a signal from the remote control. The input device 160 connects to the input device interface 108, receives operation commands from a user, and transmits the received operation commands to the CPU 101.

The communication device 170 connects to the communication device interface 109 and the network 190. The communication device 170 transmits/receives data to/from another content storage device via the network 190.

Here, the network 190 is achieved by an optical communication line, a phone line, a wireless line, and the like. The communication device 170 connects to another content storage device, the Internet, and the like via the network 190.

The following describes a functional configuration of the content storage device 200 having the above-mentioned hardware configuration with use of the drawings.

<Functional Configuration of Content Storage Device 200>

By the CPU 101 executing a program stored in the ROM 102 or the RAM 103, the content storage device 200 achieves various functions.

FIG. 2 is a functional block diagram showing a main functional block configuration of the content storage device 200.

The content storage device 200 includes a content management unit 201, a relevant metadata extraction unit 202, a display unit 204, an input reception unit 206, a reception unit 207, a transmission unit 208, and an address storage unit 209.

The content management unit 201 stores and manages a digital photograph (i.e. a content) as an image encoded in JPEG format in association with metadata. The content management unit 201 transmits/receives data to/from the relevant metadata extraction unit 202, the display unit 204, the input reception unit 206, the reception unit 207, and the transmission unit 208.

The content management unit 201 further includes a metadata extraction unit 221, a metadata updating unit 222, a content extraction unit 223, a content updating unit 224, a content management control unit 225, a metadata storage unit 231, a content storage unit 232, and a content correspondence table storage unit 233.

The content storage unit 232 is a storage area in which a digital photograph (i.e. a content) is stored as image data encoded in JPEG format. The content storage unit 232 stores therein a content and a content ID for identifying the content.

The content storage unit 232 is implemented as an area of the hard disk built into the hard disk device 130.

The metadata storage unit 231 is a storage area in which metadata corresponding to the content stored in the content storage unit 232 is stored. The metadata storage unit 231 is implemented as an area of the hard disk built into the hard disk device 130.

The metadata includes a content ID for identifying the content corresponding to the metadata, and original sub-metadata. The metadata can further include one or more pieces of additional sub-metadata.

FIG. 3 shows a data structure of metadata stored in the metadata storage unit 231. By way of example, FIG. 3 shows a data structure of metadata that corresponds to a content identified by a content ID A0001 and includes four pieces of additional sub-metadata.

The following describes the data structure of metadata with use of FIG. 3.

Metadata 300 shown in FIG. 3 includes a content ID 301 for identifying a content corresponding to the metadata 300, original sub-metadata 311, additional sub-metadata A312, additional sub-metadata B313, additional sub-metadata C314, and additional sub-metadata D315.

Here, the content ID identifies a content corresponding to metadata, and is indicated by a string composed of at least one alphabetical letter and a number with more than three digits. The alphabetical letter is information for identifying a content storage device that stores the content, whereas the number is information for identifying the content in the content storage device.

The original sub-metadata is data including attribute information that is information relating to a situation in which the content corresponding to the metadata was captured.

In an initial state, the metadata includes only the original sub-metadata.

The additional sub-metadata is data including attribute information that is information relating to a situation in which a content different from the content corresponding to the metadata was captured.

The additional sub-metadata is included in the metadata by being added. Therefore, in the initial state, the additional sub-metadata is not included in the metadata.

The additional sub-metadata is added to the metadata when the additional sub-metadata includes attribute information including at least one attribute value that is identical to an attribute value included in attribute information in the original sub-metadata (described later). Therefore, the additional sub-metadata includes attribute information including at least one attribute value that is identical to an attribute value included in attribute information in the original sub-metadata at any time.

Each piece of sub-metadata includes an original content ID 306 that identifies a content, three pieces of attribute information 310 that are information relating to a situation in which the content identified by the original content ID 306 was captured, and three match flags 305 each showing whether a corresponding one of the pieces of attribute information 310 is identical to a corresponding piece of attribute information 310 included in the original sub-metadata.

Each piece of attribute information 310 includes an attribute ID 302, and an attribute value 304.

As an attribute identified by the attribute ID 302, there are three attributes: an attribute 1 (capture date) that shows a date when the content identified by the original content ID 306 was captured; an attribute 2 (capture location) that shows a location at which the content identified by the original content ID 306 was captured; and an attribute 3 (person) that shows a person included in the content identified by the original content ID 306.

The attribute value 304 is a value corresponding to the attribute ID 302. An attribute value corresponding to the attribute 1 (capture date) indicates a date of capturing. An attribute value corresponding to the attribute 2 (capture location) indicates a regional name of a location of capturing. An attribute value corresponding to the attribute 3 (person) indicates a name for specifying a person who is an object of capturing and coordinates showing a position of a face of the person.

The coordinates showing a position of a face of the person include coordinates at an upper left point and coordinates at a lower right point of a rectangle enclosing the face of the person.

Here, a date when a content was captured is specified, for example, by capturing an object using an Exif-compliant digital still camera that has a clock function, and outputs metadata in Exif.

A location at which a content was captured is specified, for example, by capturing an object using an Exif-compliant digital still camera that has a position measuring function of specifying a regional name of the location based on longitude and latitude of the location by using a GPS (Global Positioning System).

A name and a position of a face of a person as an object are specified, for example, by capturing the object using an Exif-compliant digital still camera that has a face recognition function of specifying a name and a position of a face of the person by recognizing the face.

Here, the name of the person is registered in advance by a user with a digital still camera, in association with data of a face of the person as a template.

Note that digital still cameras having the clock function, the position measuring function, and/or the face recognition function are widely available.

The following describes the metadata 300 in detail.

As shown in FIG. 3, the content ID 301 included in the metadata 300 is A0001.

The first alphabetical letter of the content ID is "A". Therefore, a content corresponding to the metadata 300 is stored in a content storage device owned by a user A in association with the content ID 301.

The original content ID 306 included in the original sub-metadata 311 is A0001. Therefore, a content corresponding to the original sub-metadata 311 is stored in the content storage device owned by the user A.

It can be seen from the attribute information that a content identified by the content ID A0001 was captured in London on Aug. 16, 2003, and the user A and a user B are included in the content.

The original content ID 306 included in the additional sub-metadata A312 is C0005. Therefore, a content corresponding to the additional sub-metadata A312 is stored in a content storage device owned by a user C.

It can be seen from the attribute information that a content identified by the content ID C0005 was captured in Osaka on Aug. 16, 2003, and a user X is included in the content.

Here, the user X is a friend of the user C, and not necessarily a person who owns the content storage device.

The match flag 305 corresponding to the attribute 1 (capture date) is set to "1". Therefore, the capture date of Aug. 16, 2003 is identical to that of a content corresponding to the original sub-metadata 311.

The original content ID 306 included in the additional sub-metadata B313 is C0014. Therefore, a content corresponding to the additional sub-metadata B313 is stored in the content storage device owned by the user C.

It can be seen from the attribute information that a content identified by the content ID C0014 was captured in London on Feb. 6, 2005, and a user Y is included in the content.

Here, the user Y is a friend of the user C, and not necessarily a person who owns the content storage device.

The match flag 305 corresponding to the attribute 2 (capture location) is set to "1". Therefore, the capture location London is identical to that of a content corresponding to the original sub-metadata 311.

The original content ID 306 included in the additional sub-metadata C314 is B0012. Therefore, a content corresponding to the additional sub-metadata C314 is stored in a content storage device owned by the user B.

It can be seen from the attribute information that a content identified by the content ID B0012 was captured in Beijing on Sep. 26, 2000, and a user Z and the user B are included in the content.

Here, the user Z is a friend of the user B, and not necessarily a person who owns the content storage device.

The match flag 305 corresponding to the attribute 3 (person) is set to "1". Therefore, at least one of the objects (i.e. the user Z and/or the user B) is identical to that of a content corresponding to the original sub-metadata 311.

Here, an attribute value corresponding to the attribute 3 (person) included in the original sub-metadata 311 indicates the user A and the user B. Therefore, the additional sub-metadata C314 is identical to the original sub-metadata 311 in that an attribute value corresponding to the attribute 3 (person) indicates the user B.

The original content ID 306 included in the additional sub-metadata D315 is B0020. Therefore, a content corresponding to the additional sub-metadata D315 is stored in the content storage device owned by the user B.

It can be seen from the attribute information that a content identified by the content ID B0020 was captured in Fukuoka on Jan. 22, 2005, and the user B is included in the content.

The match flag 305 corresponding to the attribute 3 (person) is set to "1". Therefore, the object (i.e. user B) is identical to that of the content corresponding to the original sub-metadata 311.

The following describes the functional configuration of the content storage device 200 with use of FIG. 2 again.

The content extraction unit 223 transmits/receives data to/from the content storage unit 232 and the content management control unit 225. Upon receiving a content ID from the content management control unit 225, the content extraction unit 223 extracts encoded image data identified by the received content ID from the content storage unit 232, and outputs the encoded image data to the content management control unit 225.

The content updating unit 224 transmits/receives data to/from content storage unit 232 and the content management control unit 225. Upon receiving the content ID and the encoded image data from the content management control unit 225, the content updating unit 224 stores the received content ID and encoded image data in the content storage unit 232 in association with each other.

The metadata extraction unit 221 transmits/receives data to/from the metadata storage unit 231 and the content management control unit 225. Upon receiving the content ID from the content management control unit 225, the metadata extraction unit 221 searches the metadata storage unit 231 for metadata that corresponds to a content identified by the received content ID. When the metadata is found as a result of searching, the metadata extraction unit 221 outputs the metadata to the content management control unit 225.

In addition, upon receiving metadata from the content management control unit 225, the metadata extraction unit 221 searches the metadata storage unit 231 for metadata that includes attribute information including at least one attribute value that is identical to an attribute value included in attribute information in the received metadata. When the metadata is found as a result of searching, the metadata extraction unit 221 sets a match flag corresponding to an attribute ID identifying the attribute information including the identical attribute value to "1", and outputs the metadata to the content management control unit 225.

The metadata updating unit 222 transmits/receives data to/from the metadata storage unit 231 and the content management control unit 225. Upon receiving the content ID and the metadata, the metadata updating unit 222 searches the metadata storage unit 231 for metadata that corresponds to a content identified by the received content ID. When the metadata is found as a result of searching, the metadata updating unit 222 adds the received metadata to the found metadata as additional sub-metadata, and stores the metadata having been added the additional sub-metadata in the metadata storage unit 231.

The content correspondence table storage unit 233 is a storage area in which a content correspondence table is stored. The content correspondence table storage unit 233 is implemented as an area of the hard disk built into the hard disk device 130.

Here, the content correspondence table is a table showing, when a content storage device stores therein a copy of a content stored in another content storage device, a correspondence between (i) a content ID for identifying the content stored in the other content storage device (an original content ID) and (ii) a content ID for identifying the copy stored in the content storage device.

Figure 4:
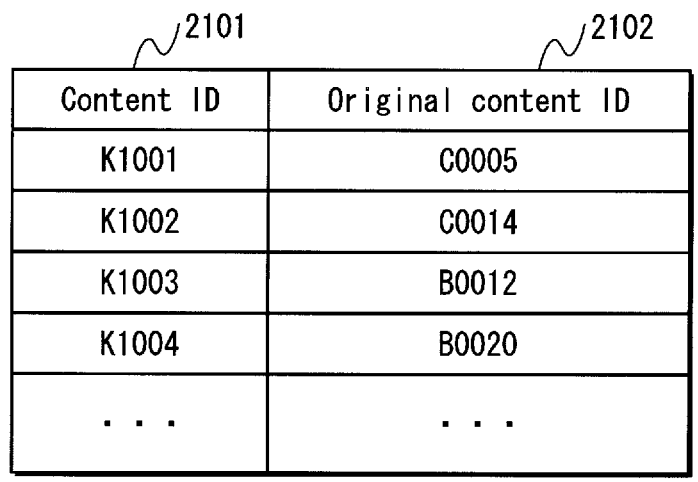
FIG. 4 shows a data structure of a content correspondence table.

FIG. 4 shows a data structure of the content correspondence table stored in the content correspondence table storage unit 233.

The original content ID 2102 shows an original content ID that is included in the additional sub-metadata in the metadata stored in the metadata storage unit 231 and identifies a content whose copy is stored in the content storage unit 232.

The content ID 2101 shows a content ID that identifies a content stored in the content storage unit 232 in association with the content identified by the original content ID 2102.

The following describes the functional configuration of the content storage device 200 with use of FIG. 2 again.

The content management control unit 225 transmits/receives data to/from the metadata extraction unit 221, the metadata updating unit 222, the content extraction unit 223, the content updating unit 224, the content correspondence table storage unit 233, the relevant metadata extraction unit 202, the display unit 204, the input reception unit 206, the reception unit 207, and the transmission unit 208.

The content management control unit 225 causes the content extraction unit 223 to extract a content from the content storage unit 232, causes the content updating unit 224 to store a content in the content storage unit 232, causes the metadata extraction unit 221 to search the metadata storage unit 231 for metadata, causes the metadata updating unit 222 to store metadata in the metadata storage unit 231, reads out the content correspondence table from the content correspondence table storage unit 233, causes the transmission unit 208 to transmit data to an external content storage device, causes the display unit 204 to display an image on the display 180, receives operation commands from a user via the input reception unit 206, and so on.

Details of the functions of the content management control unit 225 are described later, as an operation performed by the content management control unit 225, in a section describing an operation performed by the content storage device 200.

The address storage unit 209 is a storage area in which a URL (Uniform Resource Locator) of another content storage device is stored in association with a name of a user who owns the other content storage device. The address storage unit 209 is implemented as an area of the hard disk built into the hard disk device 130.

Figure 5:
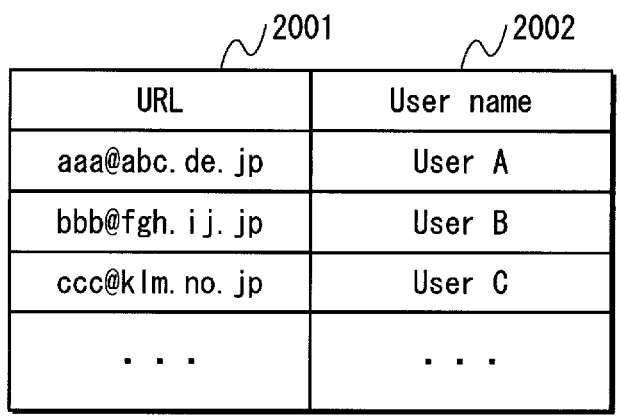
FIG. 5 shows a correspondence between URLs (Uniform Resource Locators) and user names.

FIG. 5 shows URLs and user names stored in association with each other in the address storage unit 209.

A user name 2002 shows a name of a user who owns another content storage device.

A URL 2001 shows a URL of the other content storage device owned by the user.

The following describes the functional configuration of the content storage device 200 with use of FIG. 2 again.

The reception unit 207 transmits data to the content management control unit 225 and the relevant metadata extraction unit 202. The reception unit 207 receives data transmitted from another content storage device via the network 190. When the received data is a content, the reception unit 207 transmits the received content to the content management control unit 225. On the other hand, when the received data is metadata, the reception unit 207 transmits the received metadata to the relevant metadata extraction unit 202.

The transmission unit 208 transmits/receives data to/from the content management control unit 225 and the address storage unit 209. Upon receiving information showing a user name and data from the content management control unit 225, the transmission unit 208 reads out a URL corresponding to the information showing a user name from the address storage unit 209, and transmits the received data to a content storage device having the read out URL.

The input reception unit 206 transmits data to the content management control unit 225. The input reception unit 206 receives operation commands from a user, and transmits the received operation commands to the content management control unit 225.

The relevant metadata extraction unit 202 transmits/receives data to/from the reception unit 207 and the content management control unit 225. Upon receiving metadata from the reception unit 207, the relevant metadata extraction unit 202 transmits, to the content management control unit 225, an instruction for searching the metadata storage unit 231 for metadata that includes attribute information including at least one attribute value that is identical to an attribute value included in attribute information in the original sub-metadata in the received metadata.

The display unit 204 receives data from the content management control unit 225. Upon receiving a content as encoded image data and metadata corresponding to the content from the content management control unit 225, the display unit 204 decodes the encoded image data, and determines a display position of attribute information included in the received metadata. The display unit 204 then displays the decoded image data and the attribute information included in the received metadata on the display 180.

Figure 6A:
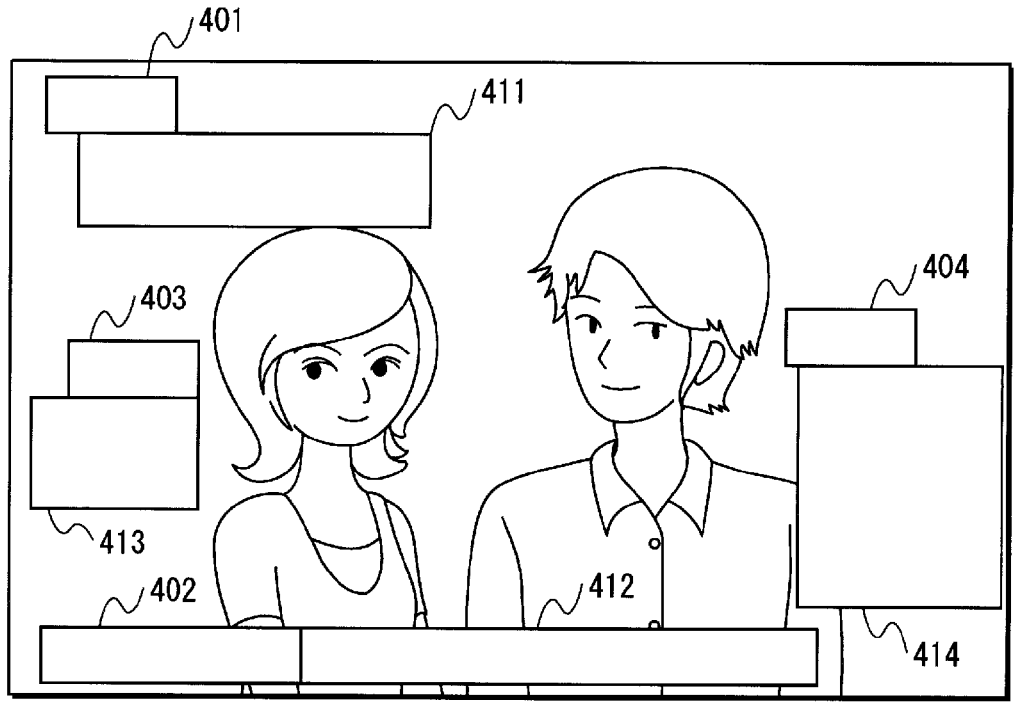
FIGS. 6A and B each show a content displayed on a display 180.
Figure 6B:
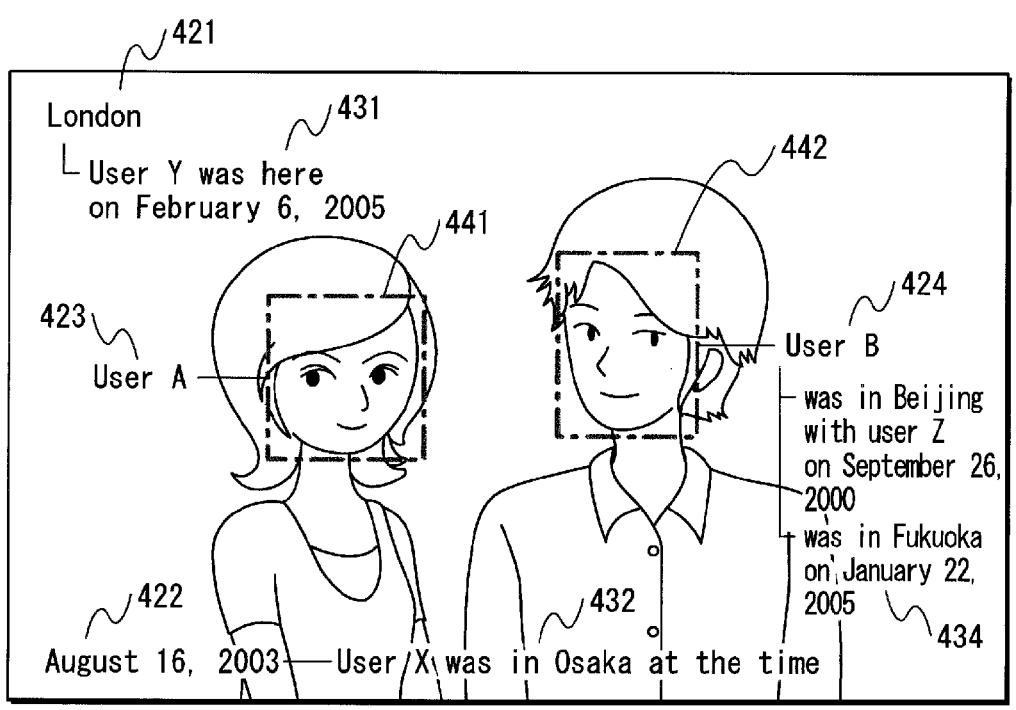

FIG. 6A shows an image displayed by the display unit 204 and a display position of metadata superimposed on the image. FIG. 6B shows a state where the display unit 204 displays the image and the metadata superimposed thereon.

The image shown in FIG. 6A is obtained by decoding a content identified by the content ID A0001 that corresponds to the metadata 300 shown in FIG. 3. A person who is on the left side of the image is the user A, and a person who is on the right side of the image is the user B.

An area 401 is positioned at an upper left corner of the image. The attribute value corresponding to the attribute 2 (capture location) included in the original sub-metadata is displayed in the area 401.

An area 402 is positioned at a lower left corner of the image. The attribute value corresponding to the attribute 1 (capture date) included in the original sub-metadata is displayed in the area 402.

Each of areas 403 and 404 is positioned near a person who is the object of capturing. The attribute value corresponding to the attribute 3 (person) included in the original sub-metadata is displayed in each of the areas 403 and 404.

A user name is displayed on a left or a right side of coordinates of a face of a user whose name is included in the attribute value.

Here, the display position of the user name is determined such that the user name is displayed on the left side of a face when the face is on the left side of the display 180 and the user name is displayed on the right side of a face when the face is on the right side of the display 180.

An area 411 is positioned under the area 401. Displayed in the area 411 is a character string created based on attribute values in additional sub-metadata in which the match flag 305 corresponding to the attribute 2 (capture location) is set to "1".

The character string is created by using the attribute values corresponding to the attribute 3 (person) and the attribute 1 (capture date) included in the additional sub-metadata as variables so as to be shown as "Person" was here on 'capture date'.

For example, in the case of the additional sub-metadata B313 in FIG. 3, the created character string is shown as "User Y was here on Feb. 6, 2005".

An area 412 is on the right side of the area 402. Displayed in the area 412 is a character string created based on attribute values in additional sub-metadata in which the match flag 305 corresponding to the attribute 1 (capture date) is set to "1".

The character string is created by using the attribute values corresponding to the attribute 3 (person) and the attribute 2 (capture location) included in the additional sub-metadata as variables so as to be shown as "Person" was in 'capture location' at the time".

For example, in the case of the additional sub-metadata A312 in FIG. 3, the created character string is shown as "User X was in Osaka at the time".

An area 413 and an area 414 are positioned under the area 403 and the area 404, respectively. Displayed in the areas 413 and 414 is a character string created based on attribute values in additional sub-metadata in which the match flag 305 corresponding to the attribute 3 (person) is set to "1".

The character string is created by using the attribute values corresponding to the attribute 1 (capture date) and the attribute 2 (capture location) included in the additional sub-metadata and an attribute value corresponding to the attribute 3 (person) that is included in the additional sub-metadata but not included in the original sub-metadata as variables. The character string is shown as "was in 'capture location' with 'person' on 'capture date'".

Note that, when there is not the attribute value corresponding to the attribute 3 (person) that is included in the additional sub-metadata but not included in the original sub-metadata, the character string is shown as "was in 'capture location' on 'capture date'".

For example, in the case of the additional sub-metadata C314 in FIG. 3, the created character string is shown as "was in Beijing with user Z on Sep. 26, 2000".

The following describes a case where the attribute information included in the metadata 300 in FIG. 3 is superimposed on the image in FIG. 6A, with use of FIG. 6B.

Displayed in the area 401 is a name of a location "London" 421, which is the attribute value corresponding to the attribute 2 (capture location) included in the original sub-metadata 311. In the area 411 under the area 401, a character string "User Y was here on Feb. 6, 2005" is displayed. The character string is created based on attribute values in the additional sub-metadata B313 in which the match flag 305 corresponding to the attribute 2 (capture location) is set to "1".

Displayed in the area 402 is a character string "Aug. 16, 2003" 422, which is the attribute value corresponding to the attribute 1 (capture date) included in the original sub-metadata 311. In the area 412 on the right side of the area 402, a character string "User X was in Osaka at the time" is displayed. The character string is created based on attribute values in the additional sub-metadata B313 in which the match flag 305 corresponding to the attribute 1 (capture date) is set to "1".

A rectangle A441 and a rectangle C442 are displayed by dashed lines. The rectangle A441 is created based on the coordinates of a face of the user A. The rectangle C442 is created based on the coordinates of a face of the user C.

Displayed in the area 403 is a name of a person "User A" 423, which is one of attribute values that corresponds to the attribute 3 (person) in the original sub-metadata 311 and is a person on the left side of the display 180. Displayed in the area 404 is a name of a person "User B" 424, which is one of attribute values that corresponds to the attribute 3 (person) in the original sub-metadata 311 and is a person on the right side of the display 180.

There is no character string to be displayed in the area 413. This indicates that there is no additional sub-metadata in which the match flag 305 corresponding to the attribute 3 (person) is set to "1" and "user A" is included the attribute value 304.

In the area 414, a character string "was in Beijing with user Z on Sep. 26, 2000" and a character string "was in Fukuoka on Jan. 22, 2005" are displayed. The former is created based on attribute values in the additional sub-metadata C314 in which the match flag 305 corresponding to the attribute 3 (person) is set to "1" and "User B" is included in the attribute value 304. The latter is created based on attribute values in the additional sub-metadata D315 in which the match flag 305 corresponding to the attribute 3 (person) is set to "1" and "user B" is included in the attribute value 304.

The following describes a content storage processing system that is composed of a plurality of the content storage devices 200 each having the above-mentioned structure, with use of the drawings.

<Configuration of Content Storage Processing System>

Figure 7:
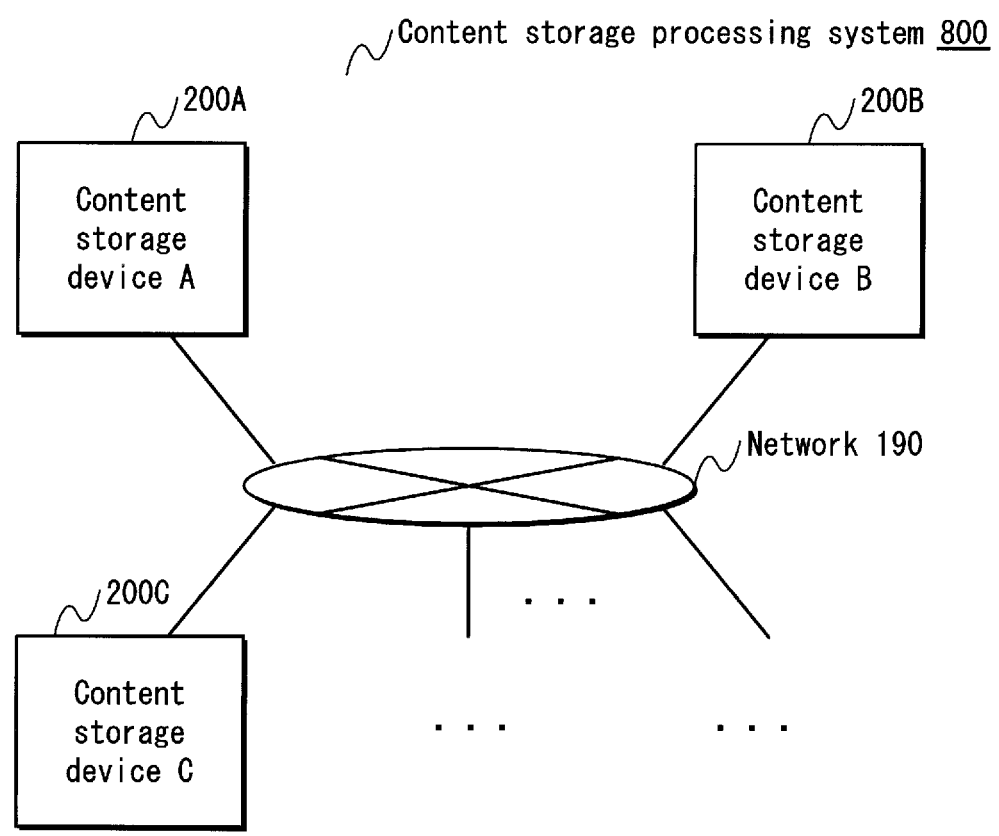
FIG. 7 shows a configuration of a content storage processing system 800.

FIG. 7 shows a configuration of a content storage processing system 800 in Embodiment 1.

A content storage device A 200A, a content storage device B 200B, and a content storage device C 200C each have the same configuration as that of the above-mentioned content storage device 200.

The content storage device A 200A, the content storage device B 200B, and the content storage device C 200C each connect to the network 190 so that the content storage device A 200A, the content storage device B 200B, and the content storage device C 200C communicate with one another via the network 190.

The following describes an operation performed by the content storage processing system having the above-mentioned structure, with use of the drawings.

<Operation>
<Content Display Operation>

Figure 8:
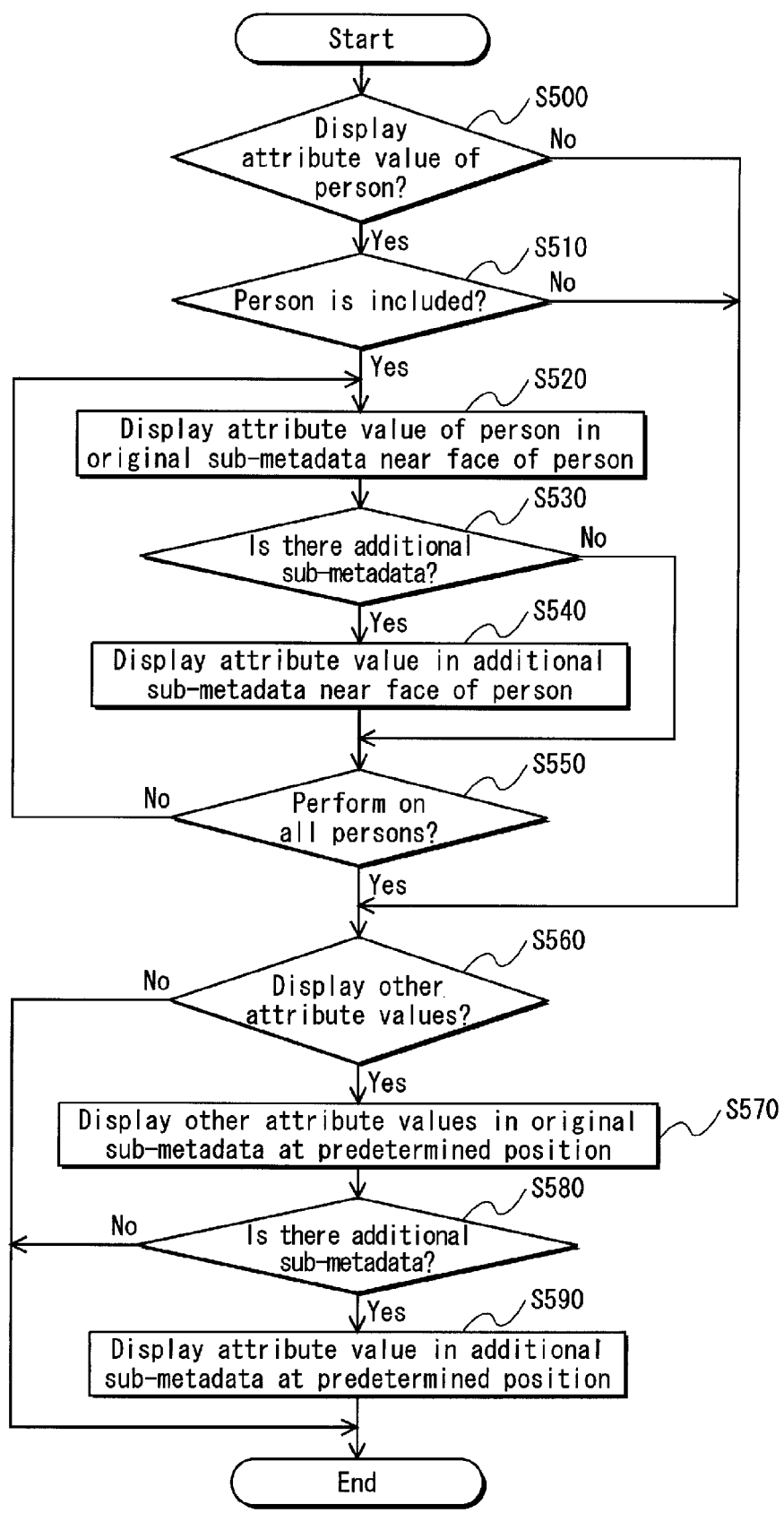
FIG. 8 is a flowchart showing a content display operation performed by a content storage device.

FIG. 8 is a flowchart showing a content display operation performed by the content storage device 200. The content storage device 200 displays, on the display 180, an image that is created by superimposing, on a content, metadata corresponding to the content in the content display operation.

Once the input reception unit 206 receives an instruction for displaying a content identified by a content ID from a user, the content storage device 200 starts the content display operation. For example, the user inputs the content ID using a remote control and then pushes a button to transmit the instruction for displaying the content identified by the content ID.

The input reception unit 206 transmits the content ID and a signal for displaying the content to the content management control unit 225.

Upon receiving the signal for displaying the content, the content management control unit 225 causes the content extraction unit 223 to extract the content identified by the received content ID from the content storage unit 232. At the same time, the content management control unit 225 causes the metadata extraction unit 221 to extract metadata corresponding to the content identified by the received content ID from the metadata storage unit 231.

In addition, the content management control unit 225 causes the display unit 204 to display the extracted content on which a character string "Display attribute value of person?" is superimposed, and waits for a response to the question to be input by the user (step S500).

Then, after the elapse of a certain period of time (e.g. 10 seconds), the display unit 204 stops displaying the character string "Display attribute value of person?".

Upon receiving, via the input reception 206, an input indicating that an attribute value of a person is displayed (Yes in step S500), the content management control unit 225 judges whether or not a person is included in the content by checking whether or not a name of the person is included in the attribute value corresponding to the attribute 3 (person) in the original sub-metadata in the extracted metadata (step S510).

When judging that a person is included in the content (Yes in step S510), the content management control unit 225 causes the display unit 204 to display the name of the person (hereinafter, referred to as a "person A") at a position near coordinates showing a position of a face of the person A (step S520).

The position near coordinates showing a position of a face of the person is, for example, the areas 403 and 404 in FIG. 6A.

The content management control unit 225 checks whether or not there is additional sub-metadata in which a name of the person A is included in the attribute value corresponding to the attribute 3 (person) (step S530). When there is the additional sub-metadata (Yes in step S530), the content management control unit 225 creates a character string "was in 'capture location' with 'person' on 'capture date'". The character string is created by using attribute values corresponding to the attribute 1 (capture date) and the attribute 2 (capture location) included in the additional sub-metadata and an attribute value corresponding to the attribute 3 (person) that is included in the additional sub-metadata but not included in the original sub-metadata as variables.

The content management control unit 225 causes the display unit 204 to display the created character string in an area under an area in which the name of the person A is displayed (step S540).

The created character string is displayed, for example, in the areas 413 and 414 in FIG. 6A.

After the processing in step S540 or when there is not the additional sub-metadata (No in step S530), the processing in step S520 to S540 is performed on all persons included in the content, i.e. all names of the persons included in the attribute value corresponding to the attribute 3 (person) in the original sub-metadata (step S550).

When receiving an input indicating that an attribute value of a person is not displayed (No in step S500), when judging that a person is not included in the content (No in step S510), and after performing the processing in step S520 to S540 on all persons included in the content (Yes in step S550), the content management control unit 225 causes the display unit 204 to display the content on which a character string "Display other attribute values?" is superimposed, and waits for a response to the question to be input by the user (step S560).

After the elapse of a certain period of time (e.g. 10 seconds), the display unit 204 stops displaying the character string "Display other attribute values?".

Upon receiving, via the input reception 206, an input indicating that the other attribute values are displayed (Yes in step S560), the content management control unit 225 causes the display unit 204 to display an attribute value corresponding to the attribute 1 (capture date) in the original sub-metadata at a lower left corner of the image, and to display an attribute value corresponding to the attribute 2 (capture location) in the original sub-metadata at an upper left corner of the image (step S570).

The attribute value corresponding to the attribute 1 (capture date) is displayed, for example, in the area 402 in FIG. 6A. The attribute value corresponding to the attribute 2 (capture location) is displayed, for example, in the area 401 in FIG. 6A.

The content management control unit 225 checks whether or not there is additional sub-metadata including (i) the attribute value corresponding to the attribute 1 (capture date) that is identical to that in the original sub-metadata or (ii) the attribute value corresponding to the attribute 2 (capture location) that is identical to that in the original sub-metadata (step S580).

When there is the additional sub-metadata including the attribute value corresponding to the attribute 1 (capture date) that is identical to that in the original sub-metadata (Yes in step S580), the content management control unit 225 creates a character string "'Person' was in 'capture location' at the time". The character string is created by using attribute values corresponding to the attribute 3 (person) and the attribute 2 (capture location) included in the additional sub-metadata as variables.

The content management control unit 225 causes the display unit 204 to display the created character string in an area on the right side of an area in which an attribute value corresponding to the attribute 1 (capture date) is displayed (step S590).

The created character string is displayed, for example, in the area 412 in FIG. 6A.

When there is the additional sub-metadata including the attribute value corresponding to the attribute 2 (capture location) that is identical to that in the original sub-metadata (Yes in step S580), the content management control unit 225 creates a character string "'Person' was here on 'capture date'". The character string is created by using the attribute values corresponding to the attribute 3 (person) and the attribute 1 (capture date) included in the additional sub-metadata as variables.

The content management control unit 225 causes the display unit 204 to display the created character string in an area under an area in which an attribute value corresponding to the attribute 2 (capture location) is displayed (step S590).

The created character string is displayed, for example, in the area 411 in FIG. 6A.

When receiving an input indicating that the other attribute values are not displayed (No in step S560), when there is not the additional sub-metadata including the attribute value corresponding to the attribute 1 (capture date) or the attribute 2 (capture location) that is identical to that in the original sub-metadata (No in step S580), and after the elapse of a certain period of time (e.g. 10 minutes) from an end of the processing in step S590, the display unit 204 stops displaying the content and the metadata to end the content display operation.

FIG. 6B shows an image displayed on the display 180 by the display unit 204 when an attribute value of a person is displayed (Yes in step S500) and when the other attribute values are displayed (Yes in step S560) in the above-mentioned content display operation for displaying the content shown in FIG. 6A and the metadata shown in FIG. 3.

Figure 9:
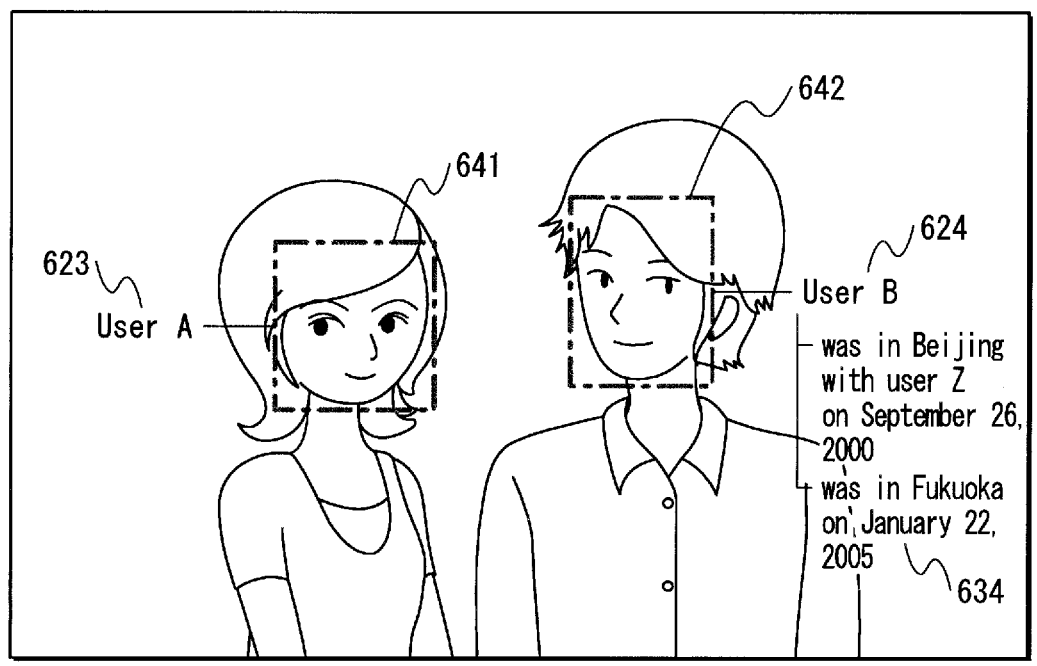
FIG. 9 shows a content displayed on the display 180.

FIG. 9 shows an image displayed on the display 180 by the display unit 204 when an attribute value of a person is displayed (Yes in step S500) and when the other attribute values are not displayed (No in step S560) in the above-mentioned content display operation for displaying the content shown in FIG. 6A and the metadata shown in FIG. 3.

In FIG. 9, the name of a location "London" 421, the character string "User Y was here on Feb. 6, 2005" 431, the character string "Aug. 16, 2003" 422, and the character string "User X was in Osaka at the time" 432, which are all displayed in FIG. 6B, are not displayed.

Figure 10:
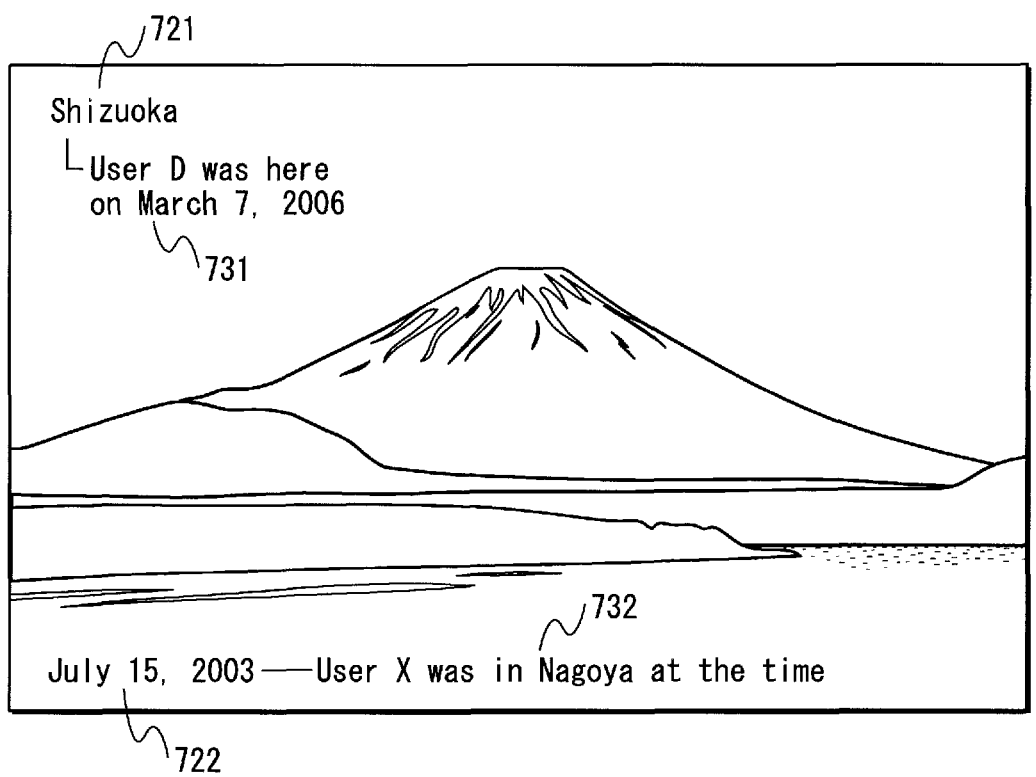
FIG. 10 shows a content displayed on the display 180.

FIG. 10 shows a content displayed on the display 180 by the display unit 204. A person is not included in the content. Therefore, a name of a person is not displayed.

<Active Metadata Collection Operation>

The following describes an active metadata collection operation performed by the content storage processing system 800 with use of the drawings.

The active metadata collection operation is performed in order to increase the number of pieces of attribute information included in metadata corresponding to a content stored in a content storage device (here, the content storage device A 200A). In the active metadata collection operation, the content storage device A 200A communicates with other content storage devices (here, the content storage device B 200B and the content storage device C 200C) to collect metadata corresponding to a content that is relevant to the content stored in the content storage device A 200A, from metadata stored in the other content storage devices.

FIG. 11 is a flowchart showing the active metadata collection operation performed by the content storage processing system 800.

While the content storage device A is displaying a content on the display 180 (step S900), upon receiving an instruction for starting the active metadata collection operation from a user with respect to the displayed content (step S905), the input reception unit 206 transmits a signal for actively collecting metadata to the content management control unit 225. For example, the user instructs the content storage device A by pushing a predetermined button on a remote control.

Upon receiving the signal for actively collecting metadata, the content management control unit 225 causes the metadata extraction unit 221 to extract metadata corresponding to the displayed content from the metadata storage unit 231. The extracted metadata is transmitted to the transmission unit 208.

Upon receiving the transmitted metadata, the transmission unit 208 transmits the received metadata and a URL of the content storage device A to URLs of all content storage devices stored in the address storage unit 209 via the network 190 (step S910).

Here, for simplicity, URLs stored in the address storage unit 209 in the content storage device A are URLs of the content storage device A itself, the content storage device B, and the content storage device C.

The reception unit 207 in each of the content storage devices B and C receives the transmitted metadata and URL via the network 190 (step S915), and then transmits the received metadata and URL to the relevant metadata extraction unit 202.

Upon receiving the transmitted metadata and URL, the relevant metadata extraction unit 202 transmits, to the content management control unit 225, an instruction for searching the metadata storage unit 231 for metadata that includes attribute information including at least one attribute value that is identical to an attribute value included in attribute information in the original sub-metadata in the received metadata. The relevant metadata extraction unit 202 also transmits the received metadata and URL to the content management control unit 225.

Upon receiving the instruction, metadata, and URL, the content management control unit 225 causes the metadata extraction unit 221 to search the metadata storage unit 231 for metadata that includes attribute information including at least one attribute value that is identical to an attribute value included in attribute information in the original sub-metadata in the received metadata (step S920).

When the metadata is found (Yes in step S920), the content management control unit 225 sets a match flag corresponding to the attribute ID identifying the attribute information including the identical attribute value to "1", and transmits the extracted metadata and the received URL to the transmission unit 208.

Upon receiving the transmitted metadata and URL, the transmission unit 208 transmits the received metadata to the received URL (i.e. the content storage device A) via the network 190 (step S925).

When the metadata is not found (No in step S920), the transmission unit 208 does not transmit metadata (step S927).

The reception unit 207 in the content storage device A receives the transmitted metadata via the network 190 within a certain period of time (e.g. two hours) (Yes in step S930). Upon receiving the transmitted metadata, the reception unit 207 transmits the received metadata to the content management control unit 225.

Upon receiving the transmitted metadata, the content management control unit 225 causes the metadata updating unit 222 to add the received metadata, as additional sub-metadata, to metadata that is stored in the metadata storage unit 231 and corresponds to a content currently being displayed to update the metadata (step S935).

The content management control unit 225 displays, on the display 180, an image that is created by superimposing the updated metadata on the content currently being displayed (step S940).

The operation for displaying, on the display 180, the image that is created by superimposing metadata on a content is described in the aforementioned content display operation.

When the metadata is not received within the certain period of time (e.g. two hours) (No in step S930), and when the input reception unit 206 receives an instruction for stopping the active metadata collection operation after the processing in step S940 (Yes in step S945), the content storage processing system ends the active metadata collection operation.

During a period from the end of the processing in step S940 until the input reception unit 206 receives the instruction for stopping the active metadata collection operation (No in step S945), the input reception unit 206 is able to receive specification of a character string created by using attribute values included in additional sub-metadata (step S950).

Here, the input reception unit 206 receives the specification of a character string by a user operation. For example, the user moves a cursor onto the character string displayed on the display 180 by using a remote control included in the input reception unit 206, and specifies the character string by clicking a button on the remote control.

Upon receiving the specification of a character string created by using attribute values included in additional sub-metadata (Yes in step S950), the input reception unit 206 transmits a signal for searching for a content corresponding to the additional sub-metadata that is associated with the specified character string to the content management control unit 225.

Upon receiving the signal for searching for a content corresponding to the additional sub-metadata, the content management control unit 225 checks whether an original content ID in the additional sub-metadata is stored in the content correspondence table storage unit 233. When the original content ID is stored in the content correspondence table storage unit 233, the content management control unit 225 judges that the content corresponding to the additional sub-metadata is stored in the content storage unit 232 (Yes in step S955). On the other hand, when the original content ID is not stored in the content correspondence table storage unit 233, the content management control unit 225 judges that the content corresponding to the additional sub-metadata is not stored in the content storage unit 232 (No in step S955).

When judging that the content corresponding to the additional sub-metadata is not stored in the content storage unit 232 (No in step S955), the content management control unit 225 transmits the original content ID that identifies the content and an instruction for obtaining the content to the transmission unit 208.

Upon receiving the original content ID and the instruction for obtaining the content, the transmission unit 208 reads out a URL corresponding to a user name specified by the first alphabetical letter of the original content ID from the address storage unit 209. The transmission unit 208 then transmits the received original content ID, the instruction for obtaining the content, and a URL of the content storage device A to the read out URL via the network 190 (step S960).

The reception unit 207 in a content storage device having the URL transmitted by the transmission unit 208 receives the original content ID, the instruction for obtaining the content, and the URL of the content storage device A via the network 190 (step S965). The reception unit 207 then transmits the received original content ID, the instruction for obtaining the content, and the URL to the content management control unit 225.

Upon receiving the original content ID, the instruction for obtaining the content, and the URL, the content management control unit 225 causes the content extraction unit 223 to extract a content identified by the received original content ID from the content storage unit 232, and then transmits the extracted content and the received URL to the transmission unit 208.

Upon receiving the extracted content and the URL, the transmission unit 208 transmits the received content to the received URL via the network 190 (step S970).

The reception unit 207 in the content storage device A receives the transmitted content via the network 190 (step S975), and then transmits the received content to the content management control unit 225.

Upon receiving the transmitted content, the content management control unit 225 creates a content ID for identifying the received content, and stores the created content ID in the content correspondence table storage unit 233 in association with the original content ID for identifying the received content. The content management control unit 225 also causes the content updating unit 224 to store the received content in the content storage unit 232 as a content identified by the created content ID.

When the received content has been stored in the content storage unit 232, and when judging that the content corresponding to the additional sub-metadata is stored in the content storage unit 232 (Yes in step S955), the content management control unit 225 causes the display unit 204 to display the additional sub-metadata and the content corresponding to the additional sub-metadata (back to step S940).

The processing in step S940 to step S975 is repeatedly performed until the instruction for stopping the active metadata collection operation is received (Yes in step S945).

<Specific Example of Active Metadata Collection Operation>

The following describes a specific example of the above-mentioned active metadata collection operation from step S900 to step S940 with use of the drawings.

Figure 13:
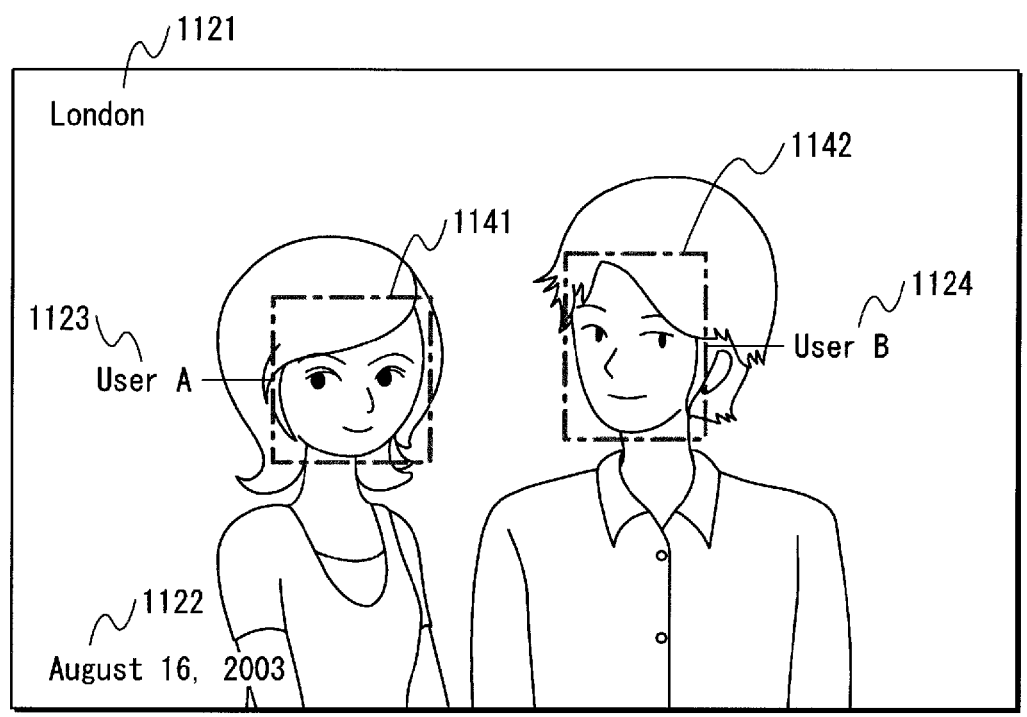
FIG. 13 shows a content displayed on the display 180.

FIG. 12A shows metadata 1001 that corresponds to a content displayed on the display 180 in step S900. FIG. 13 shows an image displayed on the display 180 in step S900.

FIG. 12B shows metadata 1002 stored in the content storage device C in which an attribute value "Aug. 16, 2003" corresponding to the attribute 1 (capture date) is identical to that in the metadata 1001. FIG. 12C shows metadata 1003 stored in the content storage device C in which an attribute value "London" corresponding to the attribute 2 (capture location) is identical to that in the metadata 1001.

FIG. 12D shows metadata 1004 stored in the content storage device B in which an attribute value "user B" corresponding to the attribute 3 (person) is identical to that in the metadata 1001. FIG. 12E shows metadata 1005 stored in the content storage device B in which an attribute value "user B" corresponding to the attribute 3 (person) is identical to that in the metadata 1001.

While an image shown in FIG. 13 is being displayed on the display 180 in step S900, upon receiving an instruction for starting the active metadata collection operation from a user with respect to the displayed content (step S905), the content storage device A transmits the metadata 1001 to the content storage devices B and C via the network 190 (step S910).

Upon receiving the metadata 1001 (step S915), the content storage device C extracts the metadata 1002 and the metadata 1003 by searching for metadata that includes attribute information including at least one attribute value that is identical to an attribute value included in attribute information in the original sub-metadata in the received metadata (step S920).

The content storage device C transmits the extracted metadata 1002 and metadata 1003 to the content storage device A via the network 190 (step S925).

Similarly, upon receiving the metadata 1001 (step S915), the content storage device B extracts the metadata 1004 and the metadata 1005 by searching for metadata that includes attribute information including at least one attribute value that is identical to an attribute value included in attribute information in the original sub-metadata in the received metadata (step S920).

The content storage device B transmits the extracted metadata 1004 and metadata 1005 to the content storage device A via the network 190 (step S925).

Upon receiving the transmitted metadata 1002, metadata 1003, metadata 1004, and metadata 1005 (step S930), the content storage device A adds these pieces of metadata to the metadata 1001 as additional sub-metadata.

The metadata 1001 updated by being added the additional sub-metadata is the metadata 300 shown in FIG. 3. The metadata 300 is stored in the metadata storage unit 231 (step S935).

The content storage device A displays, on the display 180, an image that is created by superimposing the updated metadata on the content (step S940).

The image displayed on the display 180 in step S940 is the image shown in FIG. 6B.

<Passive Metadata Collection Operation>

The following describes a passive metadata collection operation performed by the content storage processing system 800 with use of the drawings.

The passive metadata collection operation is performed when a content storage device storing a content (here, the content storage device A 200A) is operating while connecting to the network 190. In the passive metadata collection operation, the content storage device A 200A receives metadata from other content storage devices (here, the content storage device B 200B and the content storage device C 200C) to collect metadata corresponding to a content that is relevant to the content stored in the content storage device A 200A, from the received metadata.

Figure 14:
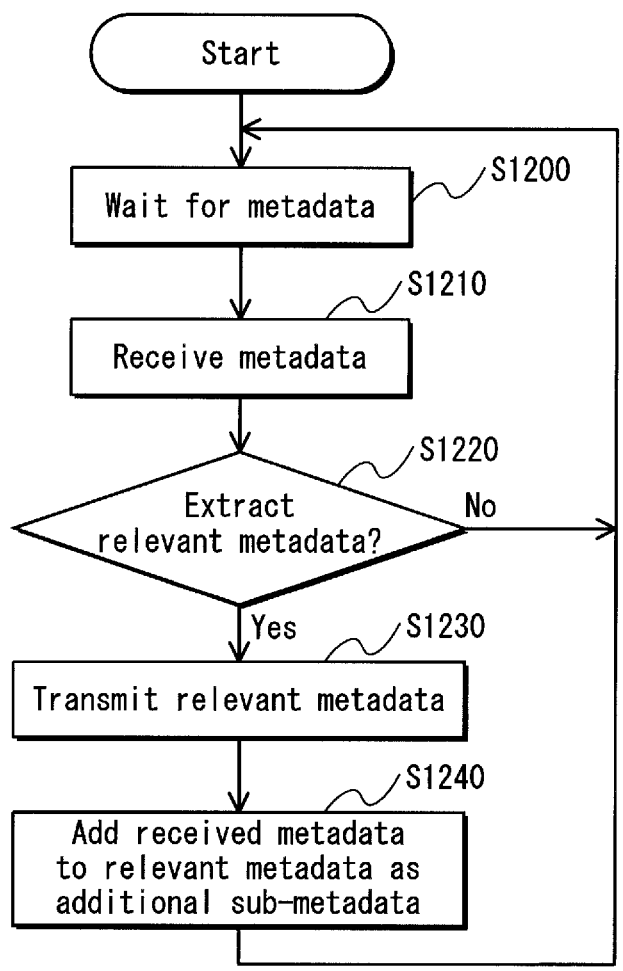
FIG. 14 is a flowchart showing a passive metadata collection operation performed by the content storage processing system.

FIG. 14 is a flowchart showing the passive metadata collection operation performed by a content storage processing system 800.

While the content storage device A is waiting for metadata (step S1200), the reception unit 207 receives metadata and a URL via the network 190 (step S1210), and then transmits the received metadata and URL to the relevant metadata extraction unit 202.

Upon receiving the transmitted metadata and URL, the relevant metadata extraction unit 202 transmits, to the content management control unit 225, an instruction for searching the metadata storage unit 231 for metadata that includes attribute information including at least one attribute value that is identical to an attribute value included in attribute information in the original sub-metadata in the received metadata. The relevant metadata extraction unit 202 also transmits the received metadata and URL to the content management control unit 225.

Upon receiving the instruction, metadata, and URL, the content management control unit 225 causes the metadata extraction unit 221 to search the metadata storage unit 231 for metadata that includes attribute information including at least one attribute value that is identical to an attribute value included in attribute information in the original sub-metadata in the received metadata (step S1220).

When the metadata is found (Yes in step S1220), the content management control unit 225 sets a match flag corresponding to the attribute ID identifying the attribute information including the identical attribute value to "1", and transmits the extracted metadata and the received URL to the transmission unit 208.

Upon receiving the transmitted metadata and URL, the transmission unit 208 transmits the received metadata to the received URL (i.e. the content storage device B or C) via the network 190 (step S1230).

After transmitting the extracted metadata and the received URL to the transmission unit 208, the content management control unit 225 updates metadata stored in the metadata storage unit 231 by causing the metadata updating unit 222 to add the metadata received from the relevant metadata extraction unit 202 to the extracted metadata as additional sub-metadata (step S1240).

After the processing in step S1240, and when the metadata is not found (No in step S1220), the processing in step S1200 to S1240 is repeatedly performed.

<Content Collection Operation>

The following describes a content collection operation performed by the content storage processing system 800 with use of the drawings.

In the content collection operation, a content storage device storing a content (here, the content storage device A 200A) collects, from other content storage devices (here, the content storage device B 200B and the content storage device C 200C), a content that corresponds to metadata to which additional sub-metadata is added in the above-mentioned passive metadata collection operation, and is specified by a user.

Figure 15:
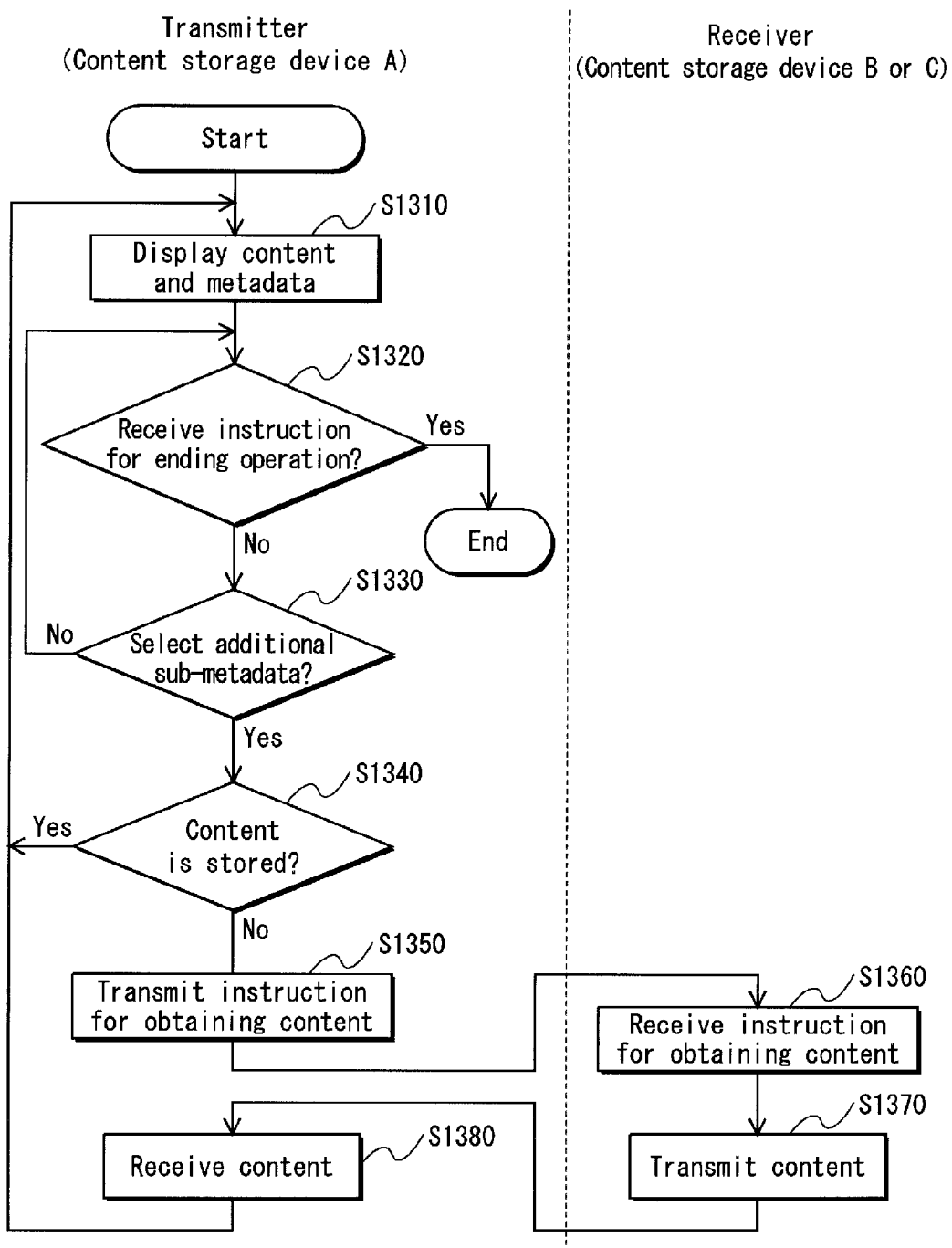
FIG. 15 is a flowchart showing a content collection operation performed by the content storage processing system.

FIG. 15 is a flowchart showing the content collection operation.

While the content storage device A is displaying a content and metadata corresponding to the content on the display 180 (step S1310), before receiving an instruction for ending the content collection operation (No in step S1320), the input reception unit 206 receives specification of a character string created by using attribute values included in additional sub-metadata (Yes in step S1330). The input reception unit 206 then transmits a signal for searching for a content corresponding to the additional sub-metadata that is associated with the specified character string to the content management control unit 225.

Upon receiving the signal for searching for a content corresponding to the additional sub-metadata, the content management control unit 225 searches the content correspondence table storage unit 233 for an original content ID that identifies the content corresponding to the additional sub-metadata. When the original content ID is stored in the content correspondence table storage unit 233, the content management control unit 225 judges that the content corresponding to the additional sub-metadata is stored in the content storage unit 232 (Yes in step S1340). On the other hand, when the original content ID is not stored in the content correspondence table storage unit 233, the content management control unit 225 judges that the content corresponding to the additional sub-metadata is not stored in the content storage unit 232 (No in step S1340).

When judging that the content corresponding to the additional sub-metadata is not stored in the content storage unit 232 (No in step S1340), the content management control unit 225 transmits the original content ID that identifies the content and an instruction for obtaining the content to the transmission unit 208.

Upon receiving the original content ID and the instruction for obtaining the content, the transmission unit 208 reads out a URL corresponding to a user name specified by the first alphabetical letter of the original content ID from the address storage unit 209. The transmission unit 208 then transmits the received original content ID, the instruction for obtaining the content, and a URL of the content storage device A to the read out URL via the network 190 (step S1350).

The reception unit 207 in a content storage device having the read out URL receives the original content ID, the instruction for obtaining the content, and the URL of the content storage device A via the network 190 (step S1360).

The reception unit 207 then transmits the received original content ID, instruction for obtaining the content, and URL to the content management control unit 225.

Upon receiving the original content ID, the instruction for obtaining the content, and URL, the content management control unit 225 causes the content extraction unit 223 to extract a content identified by the received original content ID from the content storage unit 232, and then transmits the extracted content and the received URL to the transmission unit 208.

Upon receiving the extracted content and the URL, the transmission unit 208 transmits the received content to the received URL via the network 190 (step S1370).

The reception unit 207 in the content storage device A receives the transmitted content via the network 190 (step S1380), and then transmits the received content to the content management control unit 225.

Upon receiving the transmitted content, the content management control unit 225 creates a content ID for identifying the received content, and stores the created content ID in the content correspondence table storage unit 233 in association with the original content ID for identifying the received content. The content management control unit 225 also causes the content updating unit 224 to store the received content in the content storage unit 232 as a content identified by the created content ID.

When the received content has been stored in the content storage unit 232, and when judging that the content corresponding to the additional sub-metadata is stored in the content storage unit 232 (Yes in step S1340), the content management control unit 225 causes the display unit 204 to display the additional sub-metadata and the content corresponding to the additional sub-metadata (back to step S1310).

The processing in step S1310 to step S1380 is repeatedly performed until the instruction for ending the active metadata collection operation is received (Yes in step S1320).

When the input reception unit 206 receives an instruction for stopping the content collection operation before receiving the specification of a character string created by using attribute values included in additional sub-metadata (Yes in step S1320), the content storage device ends the content collection operation.

Embodiment 2

Embodiment 1 describes operations, such as the active metadata collection operation, passive metadata collection operation, and content collection operation, performed by the content storage processing system 800 in which a plurality of content storage devices 200 connect one another via the network 190. Embodiment 2 describes a content storage processing system that performs a content chain display operation by using a content storage device 1400. The content storage device 1400 is obtained by partially modifying the content storage device 200.

Here, the content chain display operation is performed by at least two content storage devices working together. When a first content storage device is displaying a content, a second content storage device displays one or more contents that are relevant to the content being displayed by the first content storage device and stored in the second content storage device. Then, upon receiving, from a user, specification of a content in the one or more contents displayed by the second content storage device, a third (or the first) content storage device displays one or more contents that is relevant to the content specified by the user and are stored in the third (or the first) content storage device. In the above-mentioned manner, the content chain display operation is performed among content storage devices.

The following describes a configuration of a content storage processing system in Embodiment 2 with reference to the drawings.

<Configuration>

<Hardware Configuration of Content Storage Device 1400>

Hardware configuration of the content storage device 1400 is the same as that of the content storage device 200. Therefore, explanations on the hardware configuration of the content storage device 1400 are omitted here.

<Functional Configuration of Content Storage Device 1400>

Figure 16:
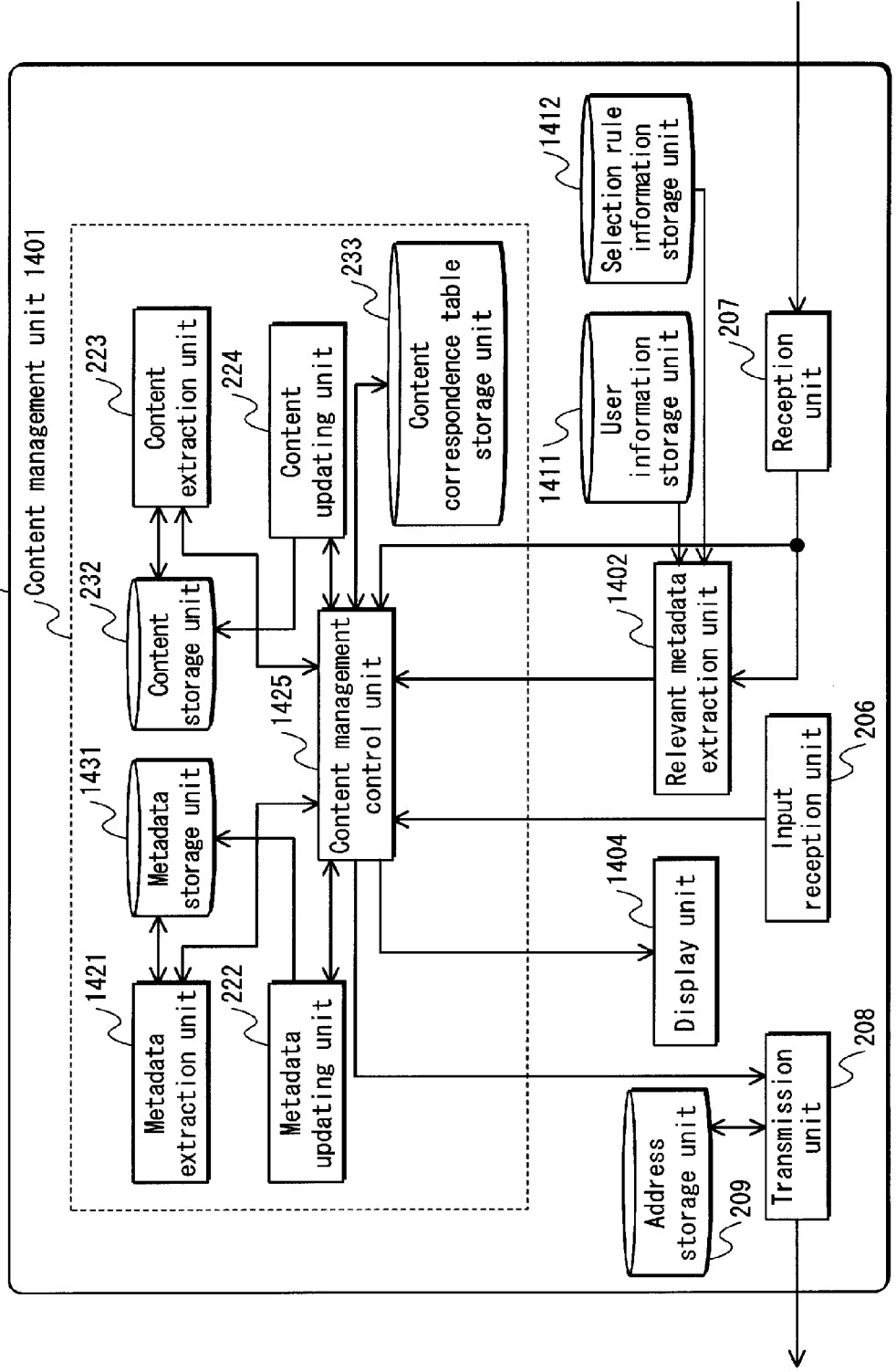
FIG. 16 is a functional block diagram showing a functional block configuration of a content storage device 1400.

FIG. 16 is a functional block diagram showing a main functional block configuration of the content storage device 1400.

The content storage device 1400 differs from the content storage device 200 in Embodiment 1 in that: the metadata storage unit 231 is replaced by a metadata storage unit 1431 for storing metadata that is partially different from the metadata in Embodiment 1; the metadata extraction unit 221 is replaced by a metadata extraction unit 1421 that is obtained by adding a new function (described later) to the metadata extraction unit 221; the content management control unit 225 is replaced by a content management control unit 1425 that is obtained by adding new functions (described later) to the content management control unit 225; the relevant metadata extraction unit 202 is replaced by a relevant metadata extraction unit 1402 that is obtained by adding a search condition specifying function (described later) and a selection rule information reading function (described later) to the relevant metadata extraction unit 202; the display unit 204 is replaced by a display unit 1404 that is obtained by adding a thumbnail function (described later) and a title creation function (described later) to the display unit 204; and a user information storage unit 1411 and a selection rule information storage unit 1412 are newly added.

Hereinafter, the above-mentioned differences from the content storage device 200 in Embodiment 1 are described.

The metadata storage unit 1431 is a modification of the metadata storage unit 231 in Embodiment 1. The metadata storage unit 1431 is a storage area in which the metadata that is partially different from the metadata in Embodiment 1 is stored. The metadata storage unit 1431 is implemented as an area of the hard disk built into the hard disk device 130.

FIG. 17 shows a data structure of metadata stored in the metadata storage unit 1431.

The metadata is obtained by adding a search target flag 1503 to the metadata stored in the metadata storage unit 231 in Embodiment 1.

The search target flag 1503 shows whether the attribute information 310 is a search target or not. When the flag is set to "0", the corresponding attribute information is a search target. On the other hand, when the flag is set to "1", the corresponding attribute information is not a search target.

The selection rule information storage unit 1412 is a storage area in which selection rule information for searching for metadata is stored. The selection rule information shows priority levels of three attribute IDs each identifying the attribute 1 (capture date), the attribute 2 (capture location), and the attribute 3 (person). The selection rule information storage unit 1412 is implemented as an area of the hard disk built into the hard disk device 130.

FIG. 18 shows a data structure of the selection rule information stored in the selection rule information storage unit 1412.

The priority level 1601 shows a priority level of the attribute ID 1602. The smaller the number is, the higher the priority is.

The user information storage unit 1411 is a storage area in which user information for searching for metadata is stored. The user information shows search conditions of the user names stored in the address storage unit 209. The user information storage unit 1411 is implemented as an area of the hard disk built into the hard disk device 130.

FIG. 19 shows a data structure of the user information stored in the user information storage unit 1411.

A search condition 1702 shows a search condition corresponding to a user identified by a user ID 1701. The search condition 1702 shows an attribute value corresponding to an attribute ID that is targeted for the searching when metadata stored in the metadata storage unit 1431 is searched for by using metadata transmitted from a content storage device owned by the user identified by the user ID 1701.

For example, in the user information shown in FIG. 19, a search condition when metadata stored in the metadata storage unit 1431 is searched for by using metadata transmitted from a content storage device owned by the user B is "the attribute 2 (capture location) is not a search target".

The metadata extraction unit 1421 is obtained by adding a new function to the metadata extraction unit 221 in Embodiment 1.

The added new function is as follows. Upon receiving metadata, a search condition, and selection rule information from the content management control unit 1425, the metadata extraction unit 1421 searches the metadata storage unit 1431 for metadata including an attribute value that is identical to an attribute value corresponding to an attribute ID whose priority level is the highest of all attribute IDs that meet the received search condition and correspond to the search target flag 1503 set to "0" in the received metadata. When the metadata is found as a result of the searching, the metadata extraction unit 1421 outputs the metadata to the content management control unit 1425.

The display unit 1404 is obtained by adding the thumbnail function and the title creation function to the display unit 204 in Embodiment 1.

The thumbnail function is as follows. Upon receiving a plurality of pairs of a content and metadata corresponding to the content from the content management control unit 1425, the display unit 1404 creates thumbnails by reducing sizes of the received contents and superimposing the received metadata on the reduced-size versions of the contents. The display unit 1404 then displays the created thumbnails on the display 180.

The title creation function is as follows. Upon receiving, from the content management control unit 1425, an attribute ID, metadata, and a name of a user who owns a device transmitting the metadata, the display unit 1404 creates a character string "From "the name of the user who owns the device transmitting the metadata": I went to "an attribute value corresponding to the attribute 2 (capture location)" on "an attribute value corresponding to the attribute 1 (capture date)" with "a user name in an attribute value corresponding to the attribute 3 (person)"". The display unit 1404 displays, on the display 180, an image that is created by superimposing the created character string on the created thumbnails as a title of the thumbnails.

When the received attribute ID identifies the attribute 1 (capture date), the display unit 1404 emphasizes a character string "an attribute value corresponding to the attribute 1 (capture date)" in the created character string. When the received attribute ID identifies the attribute 2 (capture location), the display unit 1404 emphasizes a character string "an attribute value corresponding to the attribute 2 (capture location)" in the created character string. When the received attribute ID identifies the attribute 3 (person), the display unit 1404 emphasizes a character string "a user name in an attribute value corresponding to the attribute 3 (person)" in the created character string.

Figure 20:
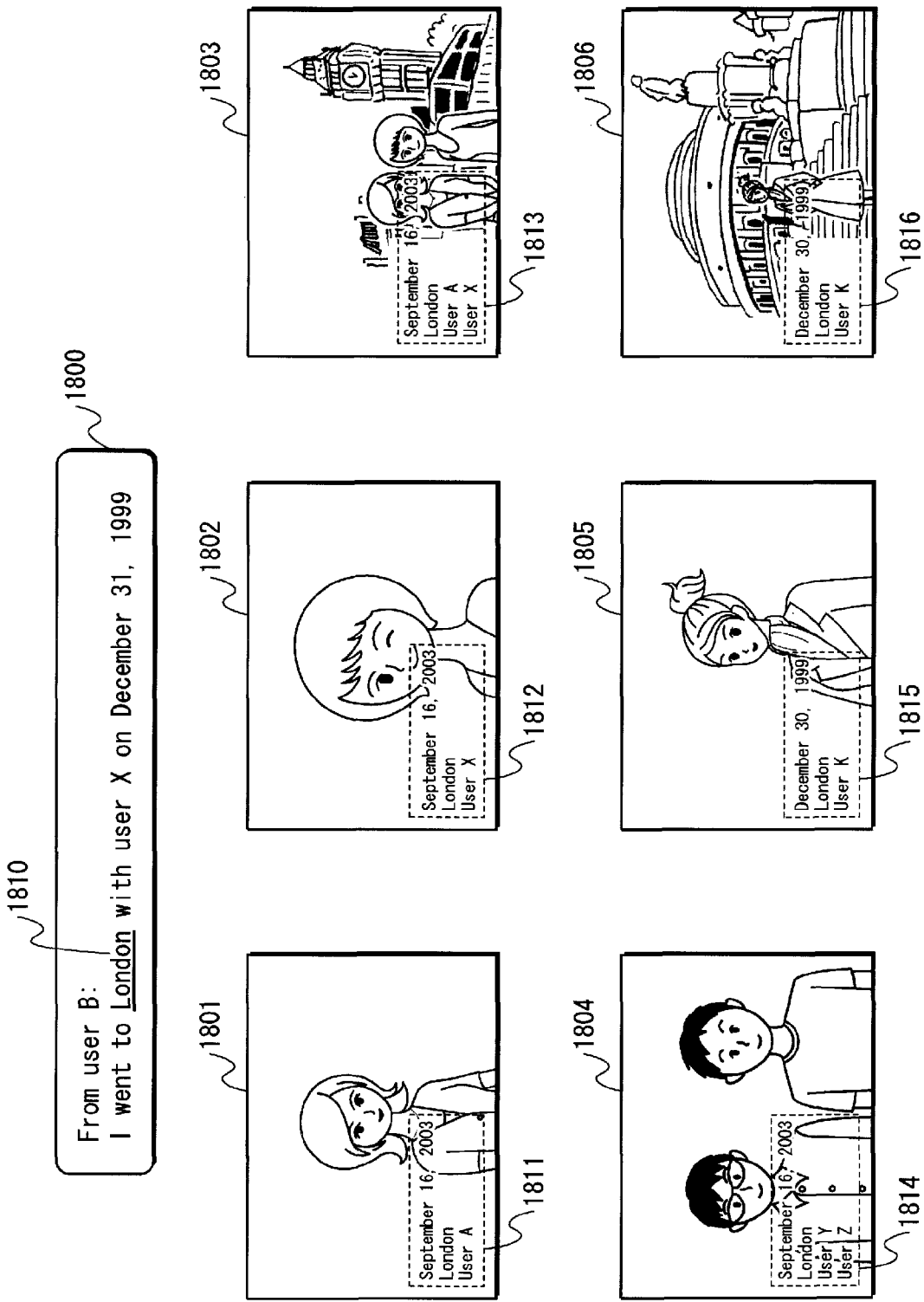
FIG. 20 shows a list of thumbnails and a title displayed on the display 180.

FIG. 20 shows an image created by the display unit 1404 using the above-mentioned thumbnail function and title creation function.

Here, the image is created by the display unit 1404 using six pairs of a content and metadata corresponding to the content, an attribute ID for identifying the attribute 2 (capture location), the metadata shown in FIG. 17, and information showing the user B as a user who owns a device transmitting the metadata.

Thumbnails 1801 to 1806 are each created by using a pair of a content and metadata corresponding to the content. Displayed in an area at a lower left corner of each thumbnail are an attribute value corresponding to the attribute 1 (capture date), an attribute value corresponding to the attribute 2 (capture location), and one or more user names in an attribute value corresponding to the attribute 3 (person) included in the metadata.

A title 1800 includes a character string created by using metadata, a name of a user who owns a device transmitting the metadata, and an attribute ID. Here, the name of a user who owns a device transmitting the metadata is a user B, an attribute value corresponding to the attribute 1 (capture date) is Dec. 31, 1999, a name of a user in an attribute value corresponding to the attribute 3 (person) is a user X, and an attribute value corresponding to the attribute 2 (capture location) is London. Therefore, a character string "From user B: I went to London with user X on Dec. 31, 1999" is created.

The received attribute ID identifies the attribute 2 (capture location). Therefore, a name of a location "London" 1810 is emphasized by being underlined.

The following describes the functional configuration of the content storage device 1400 with use of FIG. 16 again.

The relevant metadata extraction unit 1402 is obtained by adding the search condition specifying function and the selection rule information reading function to the relevant metadata extraction unit 202 in Embodiment 1.

The search condition specifying function is as follows. Upon receiving metadata from the reception unit 207, the relevant metadata extraction unit 1402 specifies a name of a user who owns a device transmitting the metadata from a content ID identifying a content corresponding to the metadata. The relevant metadata extraction unit 1402 then reads out a search condition stored in the user information storage unit 1411 in association with the specified name of a user.

The selection rule information reading function is a function of reading out the selection rule information stored in the selection rule information storage unit 1412.

The content management control unit 1425 is obtained by adding new functions to the content management control unit 225 in Embodiment 1.

The added new functions are functions of causing the metadata extraction unit 1421 to extract metadata stored in the metadata storage unit 1431, causing the display unit 1404 to display thumbnails and a title on the display 180, and so on.

Details of the functions of the content management control unit 1425 are described later, as an operation performed by the content management control unit 1425, in a section describing an operation performed by the content storage device 1400.

<Configuration of Content Storage Processing System>

Similarly to the content storage processing system 800 in Embodiment 1, the content storage processing system in Embodiment 2 has a structure in which plurality of content storage devices described above are connect one another via the network 190.

Hereinafter, for simplicity, the content storage device A and the content storage device B connect each other via the network 190.

The following describes an operation performed by the content storage processing system in Embodiment 2 having the above-mentioned structure, with use of the drawings.

Explanations on operations performed by the content storage processing system in Embodiment 2 that are the same as the operations performed by the content storage processing system 800 in Embodiment 1 are omitted here. The following describes the content chain display operation performed by the content storage processing system in Embodiment 2.

<Operation>

<Content Chain Display Operation>

The following describes the content chain display operation performed by a content storage processing system in which a content storage device A owned by a user A and a content storage device B owned by a user B connect each other via a network.

Figure 21:
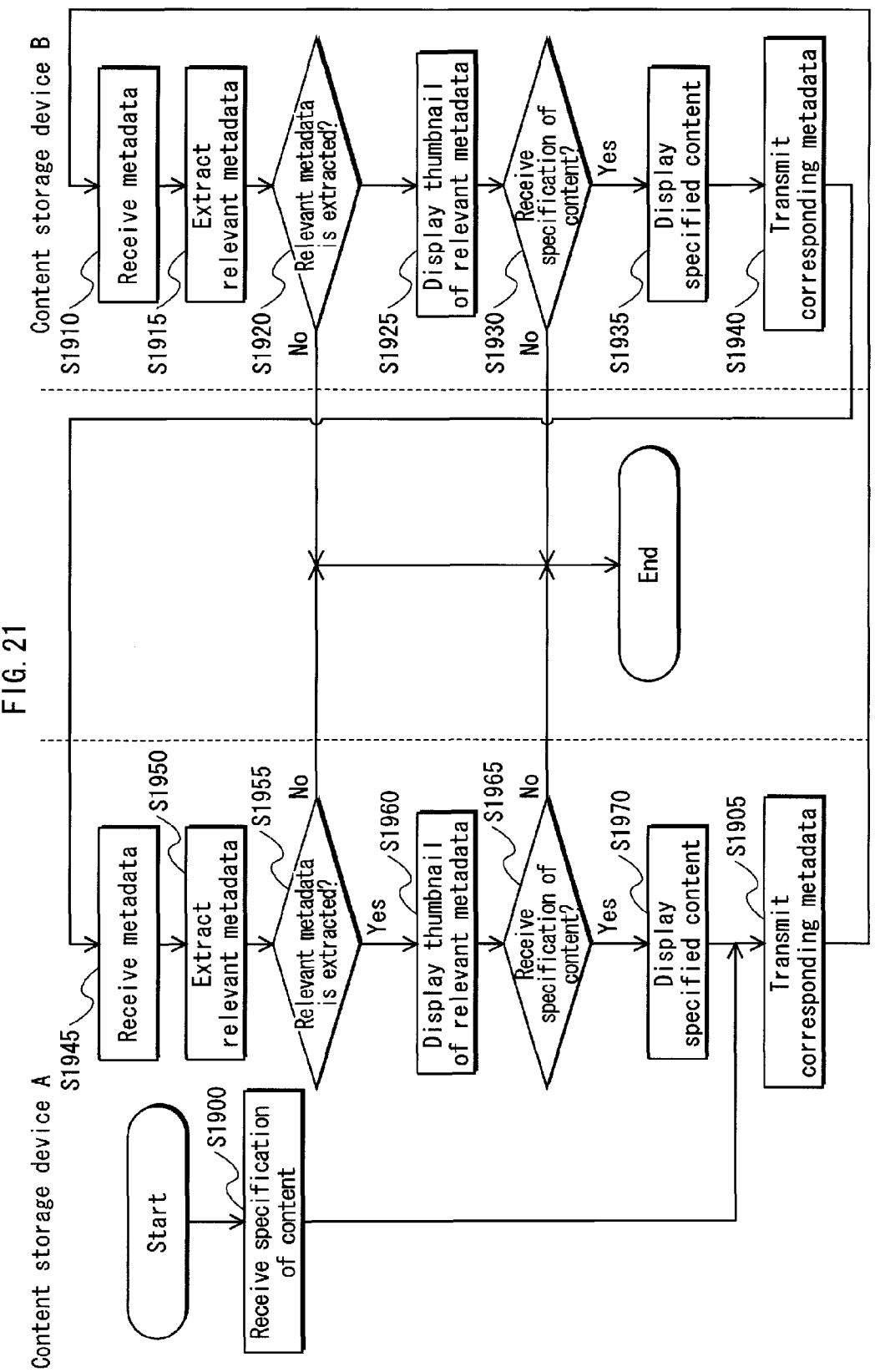
FIG. 21 is a flowchart showing a content chain display operation performed by the content storage processing system.

FIG. 21 is a flowchart showing the content chain display operation performed by the content storage device A and the content storage device B working together.

While the content storage device A is displaying a content on the display 180, upon receiving an instruction for starting the content chain display operation performed with the content storage device B from a user with respect to the displayed content (step S1900), the input reception unit 206 transmits a signal for starting the content chain display operation and a signal showing the content storage device B to the content management control unit 1425.

Upon receiving the signal for starting the content chain display operation and the signal showing the content storage device B, the content management control unit 1425 causes the metadata extraction unit 1421 to extract metadata corresponding to the displayed content from the metadata storage unit 1431. The extracted metadata and the signal showing the content storage device B are transmitted to the transmission unit 208.

Upon receiving the transmitted metadata and the signal showing the content storage device B, the transmission unit 208 transmits the received metadata and a URL of the content storage device A to a URL of the content storage device B stored in the address storage unit 209 via the network 190 (step S1905).

The reception unit 207 in the content storage device B receives the transmitted metadata and URL via the network 190 (step S1910), and then transmits the received metadata and URL to the relevant metadata extraction unit 1402.

Upon receiving the transmitted metadata and URL, the relevant metadata extraction unit 1402 reads out the selection rule information stored in the selection rule information storage unit 1412, and specifies a name of a user who owns a device transmitting the metadata from a content ID included in the metadata. The relevant metadata extraction unit 1402 then reads out a search condition stored in the user information storage unit 1411 in association with the specified name of a user.

The search condition read out here is, for example, "no restriction" when a name of a user who owns a device transmitting the metadata is the user A.

The relevant metadata extraction unit 1402 then transmits, to the content management control unit 1425, an instruction for searching the metadata storage unit 1431 for metadata that includes attribute information including at least one attribute value that is identical to an attribute value included in attribute information in the original sub-metadata in the received metadata. The relevant metadata extraction unit 1402 also transmits the received metadata and URL, the name of a user, the read out search condition, and the read out selection rule information to the content management control unit 1425.

Upon receiving the instruction, metadata, URL, name of a user, search condition, and selection rule information, the content management control unit 1425 causes the metadata extraction unit 1421 to search the metadata storage unit 1431 for metadata including an attribute value that is identical to an attribute value corresponding to an attribute ID whose priority level is the highest of all attribute IDs that meet the received search condition and correspond to the search target flag 1503 set to "0" in the received metadata (hereinafter, referred to as a new search attribute ID) (step S1920).

When one or more pieces of metadata are extracted as a result of the searching (Yes in step S1920), the content management control unit 1425 causes the content extraction unit 223 to extract all contents corresponding to the extracted one or more pieces of metadata. The content management control unit 1425 transmits, to the display unit 1404, all pairs of the extracted contents and metadata, the name of a user, the metadata transmitted from the relevant metadata extraction unit 1402, and the new search attribute ID.

The content management control unit 1425 checks whether or not an attribute ID corresponding to a search target flag set to "1" is included in the metadata transmitted from the relevant metadata extraction unit 1402, and temporarily stores the attribute ID corresponding to a search target flag set to "1" as an old search attribute ID.

Upon receiving the pairs of the contents and metadata, the name of a user, the metadata transmitted from the relevant metadata extraction unit 1402, and the new search attribute ID, the display unit 1404 creates thumbnails for all the received pairs of the contents and metadata by reducing sizes of the received contents and superimposing the received metadata on the reduced-size versions of the contents. The display unit 1404 then displays the created thumbnails on the display 180. The display unit 1404 also creates a character string "From "the name of the user who owns the device transmitting the metadata": I went to "an attribute value corresponding to the attribute 2 (capture location)" on "an attribute value corresponding to the attribute 1 (capture date)" with "a user name in an attribute value corresponding to the attribute 3 (person)"" by using the received attribute ID, metadata, name of a user. The display unit 1404 superimposes the created character string on the created thumbnails as a title of the thumbnails (step S1925).

When receiving specification of a thumbnail from a user within a certain period of time (e.g. 10 minutes) after the display unit 1404 displays the thumbnails (Yes in step S1930), the input reception unit 206 transmits a content ID that identifies a content displayed in the specified thumbnail (hereinafter, referred to as a user specified content ID) to the content management control unit 1425.

Here, the input reception unit 206 receives the specification of a thumbnail by a user operation. For example, the user moves a cursor onto the thumbnail displayed on the display 180 by using a remote control included in the input reception unit 206, and specifies the thumbnail by clicking a button on the remote control.

Upon receiving the user specified content ID, the content management control unit 1425 sets a search target flag corresponding to a new search attribute ID and a search target flag corresponding to an old search attribute ID in metadata corresponding to a content identified by the user specified content ID to "1". The content management control unit 1425 then transmits the user specified metadata and the URL transmitted from the relevant metadata extraction unit 1402 to the transmission unit 208 (step S1935).

Upon receiving the transmitted metadata and URL, the transmission unit 208 transmits the received metadata and a URL of the content storage device B to the received URL (i.e. the content storage device A) via the network 190 (step S1940).

The reception unit 207 in the content storage device A receives the transmitted metadata and URL via the network 190 (step S1945), and then transmits the received metadata and URL to the relevant metadata extraction unit 1402.

The content storage device A then performs processing from step S1950 to step S1970. The processing from step S1950 to step S1970, however, is similar to the processing from step S1910 to step S1935 performed by the content storage device B. Therefore, explanations on the processing from step S1950 to step S1970 are omitted.

Note that steps S1950, S1955, S1960, S1965, and S1970 correspond to steps S1915, S1920, S1925, S1930, and S1935, respectively.

After the processing in step S1970, the transmission unit 208 in the content storage device A transmits the received metadata and a URL of the content storage device A to the received URL (i.e. the content storage device B) via the network 190 (step S1910).

When the content storage device B does not extract the metadata (No in step S1920), when specification of a thumbnail is not received within a certain period of time (e.g. 10 minutes) (No in step S1930), the content storage device A does not extract the metadata (No in step S1955) and when specification of a thumbnail is not received within a certain period of time (e.g. 10 minutes) (No in step S1965), the content storage devices A and B end the content chain display operation.

The above-mentioned content chain display operation enables a user A who owns the content storage device A to transmit a content that is being viewed by the user A to a user B who is a friend of the user A and owns the content storage device B. Then, one or more contents that are owned by the user B and relevant to the transmitted content can be displayed on a display in the content storage device B.

Furthermore, the content chain display operation enables the user B to select a content from among one or more contents being displayed, and transmit the selected content to the content storage device A owned by the user A. Then, one or more contents that are owned by the user A and relevant to the transmitted content can be displayed on a display in the content storage device A.

After the start of the content chain display operation, an attribute ID used for extracting metadata is not used to extract metadata again. This prevents transmission/reception of same metadata.

As described above, it is possible to perform the chain display operation between the content storage devices A and B.

<Others>

The present invention has been explained by taking examples of a content storage processing system in which a plurality of content storage devices connect one another via a network, and communicate one another to perform the active metadata collection operation, passive metadata collection operation, content collection operation, content chain display operation and so on. It is obvious, however, that the present invention is not limited to the content storage processing system explained in the above embodiments, and the following modifications can also be implemented.

(1) In Embodiment 1, the content storage device 200 includes the hard disk recorder 100, and the display 180 as hardware. The content storage device 200, however, does not have to include the hard disk recorder 100 as long as the functions of the content storage device 200 are executed. For example, an information device handling digital data such as a personal computer, a PDA (Personal Digital Assistant), and a mobile phone terminal may be included in the content storage device 200 in place of the hard disk recorder 100.

In addition, the hard disk recorder 100 and the display 180 do not have to be separated from each other. A hard disk recorder system obtained by combining a hard disk recorder and a display may be used.

(2) In Embodiment 1, the hard disk recorder 100 stores a digital photograph (i.e. a content) as data encoded in JPEG format. The hard disk recorder 100, however, may store data encoded in a format other than the JPEG format, for example, data encoded in a PNG (Portable Network Graphics) format and data encoded in a GIF (Graphics Interchange Format) as long as the digital photograph is stored as digital data. Alternatively, the hard disk recorder 100 may store bitmap data, which has not been encoded.

In addition, although a digital photograph is taken as an example of the content, digital data other than a photograph, such as moving pictures taken by using a digital movie camera and the like, product information posted on the website may be used as the content.

(3) In Embodiment 1, the system LSI 110 integrates the CPU 101, the ROM 102, the RAM 103, the hard disk device interface 104, the reading/writing device interface 105, the decoder 106, the output device interface 107, the input device interface 108, the communication device interface 109, and the bus line 120. They, however, do not have to be integrated into a single LSI, and may be achieved by a plurality of integrated circuits or the like.

(4) In Embodiment 1, the display 180 has a PDP. The display 180, however, does not have to have a PDP as long as a content and metadata are displayed on the display 180, and may have a liquid crystal display, an organic EL (Electro Luminescence) display, a cathode-ray tube, or the like, in place of the PDP.

(5) In Embodiment 1, the decoder 106 is a DSP. The decoder 106, however, does not have to be the DSP as long as encoded data is decoded by the decoder 106. For example, the CPU 101 may double as the decoder 106. Alternatively, the decoder 106 may be a CPU that is different from the CPU 101, and a dedicated communication circuit constructed from an ASIC or the like.

(6) In Embodiment 1, the input device 160 includes a remote control. The input device 160, however, does not have to include a remote control as long as operation commands from a user are received by the input device 160. For example, the input device 160 may include a keyboard and a mouse. Alternatively, the hard disk recorder 100 may have buttons for receiving operation commands from a user as the input device 160.

(7) In Embodiment 1, the content ID 301 is indicated by a string composed of at least one alphabetical letter and a number with more than three digits. The structure of the content ID 301, however, is not limited to the above as long as the content ID 301 uniquely identifies a content in the content storage processing system 800.

(8) In Embodiment 1, attribute IDs included in the attribute information 310 are the attribute 1 (capture date), the attribute 2 (capture location), and the attribute 3 (person). The attribute information 310, however, does not have to include these three attribute IDs. The attribute information 310 may include an attribute ID other than these three attribute IDs, for example, an attribute ID that identifies a device used in capturing, an attribute ID that identifies brightness in capturing, and an attribute ID that identifies a shutter speed in capturing.

(9) In Embodiment 1, the coordinates showing a position of a face of a person include coordinates at an upper left point and coordinates at a lower right point of a rectangle enclosing the face of the person. The coordinates, however, are not limited to the above as long as the coordinates show a position of a face of a person. For example, the coordinates may include coordinates of a center and a radius of a circle enclosing a face of a person, or coordinates at an upper left point of a rectangle enclosing a face of a person and a height and width of the rectangle.

(10) In Embodiment 1, the relevant metadata extraction unit 202 transmits, to the content management control unit 225, an instruction for searching the metadata storage unit 231 for metadata that includes attribute information including at least one attribute value that is identical to an attribute value included in attribute information in the original sub-metadata in the received metadata. The attribute value of attribute information does not have to be included in the original sub-metadata, and may be included in the additional sub-metadata.

(11) In Embodiment 1, the area 401 is positioned at an upper left corner of the image. The area 401, however, may be at a position other than the upper left corner of the image, for example, at an upper right corner of the image.

If it is difficult to recognize characters due to a relation between a background color and a color of the characters when the area 401 is positioned at the upper left corner of the image, a display position of the characters may be changed to a position where the characters are recognized easily.

Similarly, although the area 402 is positioned at a lower left corner of the image, the area 402 may be at a position other than the lower left corner of the image, for example, at a lower right corner of the image.

If it is difficult to recognize characters due to a relation between a background color and a color of the characters when the area 402 is positioned at the lower left corner of the image, the display position of the characters may be changed to a position where the characters are recognized easily.

Similarly, the areas 403 and 404 may be at any positions as long as a face corresponding to each area is specified.

(12) In Embodiment 1, the area 411 is positioned under the area 401. The area 411, however, may be at a position other than the position under the area 401, for example, at a position on the right side of the area 401 as long as a correspondence between the area 411 and the area 401 is specified.

If it is difficult to recognize characters due to a relation between a background color and a color of the characters when the area 411 is positioned under the area 401, a display position of the characters may be changed to a position where the characters are recognized easily.

Similarly, the area 412 is on the right side of the area 402. The area 412, however, may be at a position other than the position on the right side of the area 402, for example, at a position above the area 402 as long as a correspondence between the area 412 and the area 402 is specified.

If it is difficult to recognize characters due to a relation between a background color and a color of the characters when the area 412 is positioned on the right side of the area 402, a display position of the characters may be changed to a position where the characters are recognized easily.

Similarly, the areas 413 and 414 are positioned under the areas 403 and 404, respectively. The areas 413 and 414, however, may be at any positions as long as a correspondence between the area 413 and the area 403 and a correspondence between the area 414 and the area 404 are specified, respectively.

(13) In Embodiment 1, a content and metadata corresponding to the content are displayed on the display 180 in a manner shown in FIG. 6B. A content and metadata corresponding to the content, however, may be displayed in other manners. For example, a content may be displayed on a left side of the display 180 and metadata corresponding to the content may be displayed on a right side of the display 180.

Figure 22:
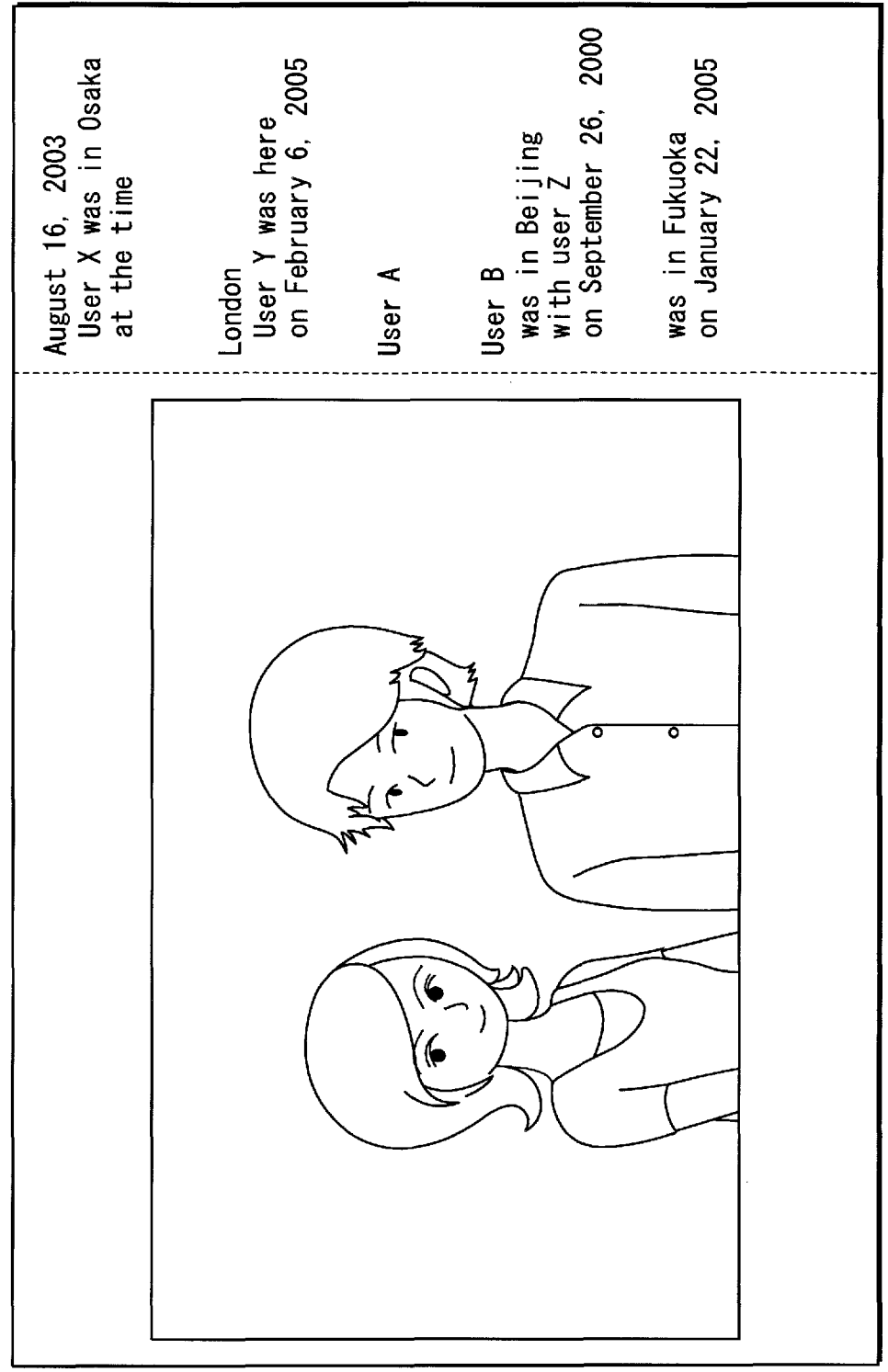
FIG. 22 shows a content and metadata displayed on the display 180.

FIG. 22 shows an image in which a content is displayed on a left side of the display 180 and metadata corresponding the content is displayed on a right side of the display 180.

(14) In Embodiment 1, the content storage processing system 800 has a structure in which three content storage devices connect one another via a network. The content storage processing system 800, however, may have a structure in which two content storage devices or four or more content storage devices connect one another via the network.

(15) In Embodiment 1, whether to display an attribute value of a person or not is specified by a user each time the content display operation is performed. A user, however, does not have to specify whether to display an attribute value of a person each time the content display operation is performed. For example, the content storage device may have a mode in which an attribute value of a person is displayed and a mode in which an attribute value of a person is not displayed. Once one of the modes is set by a user, the content storage device operates in the set mode until the set mode is changed to the other mode.

Similarly, whether to display other attribute values or not is specified by a user each time the content display operation is performed. A user, however, does not have to specify whether to display other attribute values each time the content display operation is performed. For example, the content storage device may have a mode in which other attribute values are displayed and a mode in which other attribute values are not displayed. Once one of the modes is set by a user, the content storage device operates in the set mode until the set mode is changed to the other mode.

(16) In Embodiment 1, upon receiving metadata, the transmission unit 208 transmits the received metadata and its own URL to URLs of all content storage devices stored in the address storage unit 209 in the active metadata collection operation. The transmission unit 208, however, does not have to transmit the received metadata and its own URL to URLs of all content storage devices stored in the address storage unit 209. For example, the transmission unit 208 may transmit them to URLs of one or more content storage devices that are determined in advance, or to URLs of one or more content storage devices that are specified by a user.

(17) In Embodiment 1, a name and a position of a face of a person included in a content are specified by capturing an object using an Exif-compliant digital still camera that has a face recognition function of specifying a name and a position of a face of the person by recognizing the face of the person. A name and a position of a face of a person can be specified without using a digital still camera having a face recognition function.

For example, a name and a position of a face of a person are specified by the CPU 101 in the content storage device 200 executing a program for achieving a face recognition function stored in the ROM 102.

(18) In Embodiment 1 and Embodiment 2, when a content storage device to which the transmission unit 208 has transmitted data is not able to receive the transmitted data because the content storage device is not operating, not connecting to a network, or the like, the transmission unit 208 may transmit the same data again after the elapse of a certain period of time (e.g. one hour).

(19) In Embodiment 2, the name of a location "London" 1810 in the title 1800 is emphasized by being underlined. The name of a location "London" 1810, however, does not have to be emphasized by being underlined, and may be emphasized, for example, by changing a font, a color, and a character size, or by being blinked.

(20) In Embodiment 2, the content storage processing system has a structure in which two content storage devices connect each other via a network. The content storage processing system, however, may have a structure in which three or more content storage devices connect one another via the network.

(21) In Embodiment 2, upon receiving metadata and a URL, the relevant metadata extraction unit 1402 specifies a name of a user who owns a device transmitting the metadata from a content ID in the metadata. The relevant metadata extraction unit 1402, however, may specify the name of a user from the received URL.

(22) In Embodiment 2, the selection rule information for searching for metadata shows a priority level of each attribute ID. The selection rule information, however, may be information showing a combination of attribute values to be extracted, or may be information for randomly determining an attribute ID whose priority level is the highest of all attribute IDs.

Furthermore, an attribute value to be extracted does not have to be completely identical to an attribute value included in the received metadata. Metadata including an attribute value that is the closest to the attribute value in the received metadata or metadata including an attribute value that is the furthest from the attribute value in the received metadata may be extracted.

(23) In Embodiment 1 and Embodiment 2, a signal for actively collecting metadata and a signal for performing the content chain display operation are generated by a user operation. The method for generating these signals, however, is not limited to the above. For example, these signals may be automatically generated when addition of a new content is detected by a device.

(24) In Embodiment 1, by way of example, a case where all pieces of sub-metadata are targeted for being displayed when there are a plurality of pieces of additional sub-metadata to be displayed is described. The content storage device, however, does not have to display all pieces of sub-metadata. For example, the content storage device may display three pieces of sub-metadata having been added recently.

The present invention is broadly applicable to a device having a function of storing a digital content.

REFERENCE SIGNS LIST 200 content storage device
201 content management unit
202 relevant metadata extraction unit
204 display unit
206 input reception unit
207 reception unit
208 transmission unit
209 address storage unit
221 metadata extraction unit
222 metadata updating unit
223 content extraction unit
224 content updating unit
225 content management control unit
231 metadata storage unit
232 content storage unit
233 content correspondence table storage unit

The invention claimed is:

1. A content storage device that is any one of a plurality of content storage devices in a content storage processing system, each of the content storage devices comprising:
a content storage unit operable to store a content;
a metadata storage unit operable to store original metadata indicating a situation in which the content has been captured;
a transmission unit operable to transmit the original metadata to another one of the content storage devices;
a reception unit operable to receive original metadata transmitted from any other one of the content storage devices; and
an extraction unit operable to extract, from the original metadata stored in the metadata storage unit, relevant metadata that is relevant to original metadata received by the reception unit and corresponds to a content that is not stored in the content storage device having received the original metadata and that is stored in any other one of the content storage devices that has transmitted the original metadata, wherein
when the relevant metadata is extracted by the extraction unit, the transmission unit further transmits the extracted relevant metadata to the other one of the content storage devices that has transmitted the original metadata received by the reception unit,
the reception unit further receives relevant metadata transmitted from any other one of the content storage devices in response to the transmission of the original metadata to the other one of the content storage devices, the relevant metadata being relevant to the transmitted original metadata and being the original metadata stored in the other one of the content storage devices which indicates a situation in which a content corresponding to the relevant metadata has been captured, and
each of the content storage devices further comprises a display unit operable to display the content, the original metadata, and the relevant metadata together on a display.

2. The content storage device of claim 1, wherein the original metadata includes one or more pieces of attribute information each indicating an attribute of the content corresponding thereto,
the relevant metadata includes one or more pieces of attribute information each indicating an attribute of the content corresponding thereto, and
the original metadata and the relevant metadata include at least one identical piece of attribute information.

3. The content storage device of claim 2, further comprising
a metadata updating unit operable to update the original metadata by adding the received relevant metadata to the original metadata.

4. The content storage device of claim 3, further comprising
a relevant metadata extraction unit operable to extract relevant metadata relevant to the updated original metadata, by using a piece other than the at least one identical piece among the pieces of attribute information included in the updated original metadata, wherein
the display unit displays the extracted relevant metadata on the display.

5. The content storage device of claim 4, further comprising
a character string creation unit operable to, when the relevant metadata includes two or more pieces of the following attribute information: attribute information indicating a person included in the corresponding content; attribute information indicating a date when the corresponding content has been captured; and attribute information indicating a location at which the corresponding content has been captured, create a character string by using the two or more pieces of the attribute information.

6. The content storage device of claim 4, further comprising
an input reception unit operable to receive a user operation on data displayed on the display, wherein
when the input reception unit receives a user operation on the relevant metadata displayed on the display, the reception unit receives the content corresponding to the relevant metadata from the other content storage device, and the display unit displays the received content on the display.

7. The content storage device of claim 1, further comprising
an input reception unit operable to receive a user operation on data displayed on the display, wherein
when the input reception unit receives a user operation on the relevant metadata displayed on the display, the reception unit receives the content corresponding to the relevant metadata from the other content storage device, and the display unit displays the received content on the display.

8. A content storage method used in a content storage device, the content storage device being any one of a plurality of content storage devices in a content storage processing system, the content storage method for each of the content stored devices comprising:
a storing step of storing, in a content storage unit, original metadata which indicates a situation in which a content has been captured;
a transmission step of transmitting, using a transmission unit, the original metadata to another one of the content storage devices;
a reception step of receiving, using a reception unit, original metadata transmitted from any other one of the content storage devices; and
an extraction step of extracting, from the original metadata stored, relevant metadata that is relevant to the original metadata received and corresponds to a content that is not stored in the content storage device having received the original metadata and that is stored in any other one of the content storage devices that has transmitted the original metadata, wherein when the relevant metadata is extracted, the transmission step further transmits the extracted relevant metadata to the other one of the content storage devices that has transmitted the original metadata received, the reception step further receives relevant metadata transmitted from any other one of the content storage devices in response to the transmission of the original metadata to the other one of the content storage devices, the relevant metadata being relevant to the transmitted original metadata and being the original metadata stored in the other one of the content storage devices which indicates a situation in which content corresponding to the relevant metadata has been captured, and each of the content storage devices further performs a display step of displaying, using a display unit, the content, the original metadata, and the relevant metadata together on a display.

* * * * *